(12) United States Patent
Miyahara et al.

(10) Patent No.: US 11,026,054 B2
(45) Date of Patent: Jun. 1, 2021

(54) INFORMATION PROCESSING APPARATUS, INFORMATION PROCESSING METHOD, AND PROGRAM FOR DETERMINING A POSITION OF A TARGET IN RELATION TO A REFERENCE REGION

(71) Applicant: SONY CORPORATION, Tokyo (JP)

(72) Inventors: Masanori Miyahara, Tokyo (JP); Yuji Kitazawa, Saitama (JP); Satoshi Suzuno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/491,440

(22) PCT Filed: Mar. 29, 2018

(86) PCT No.: PCT/JP2018/013280
§ 371 (c)(1),
(2) Date: Sep. 5, 2019

(87) PCT Pub. No.: WO2018/193808
PCT Pub. Date: Oct. 25, 2018

(65) Prior Publication Data
US 2020/0034376 A1 Jan. 30, 2020

(30) Foreign Application Priority Data

Apr. 21, 2017 (JP) .............. JP2017-084834
Jan. 10, 2018 (JP) .............. JP2018-001585

(51) Int. Cl.
*H04W 4/029* (2018.01)
*G06F 16/29* (2019.01)
(Continued)

(52) U.S. Cl.
CPC ........ *H04W 4/029* (2018.02); *G01C 21/3617* (2013.01); *G01C 21/3682* (2013.01);
(Continued)

(58) Field of Classification Search
CPC ....... H04W 4/029; H04W 88/02; H04W 4/02; H04W 4/021; H04W 4/025; H04W 4/027;
(Continued)

(56) References Cited

U.S. PATENT DOCUMENTS 9,877,154 B2 * 1/2018 Shaik ................... H04W 4/021
9,960,986 B2 * 5/2018 Tao ....................... H04W 4/021
(Continued)

FOREIGN PATENT DOCUMENTS

EP 3142090 A1 3/2017
JP 2005-267079 A 9/2005
(Continued)

OTHER PUBLICATIONS

Feb. 14, 2020, European Search Report issued for related EP Application 18788088.5.
(Continued)

*Primary Examiner* — Magdi Elhag
(74) *Attorney, Agent, or Firm* — Paratus Law Group, PLLC

(57) ABSTRACT

There is provided an information processing apparatus to reduce human burdens in setting work for a watch-over system, the information processing apparatus including: a determination unit that determines whether or not a position of a target is within a reference region, the reference region being a geographic region; an extraction unit that extracts a (Continued)

reference region candidate as a candidate for the reference region; and an output unit that outputs information related to the extracted reference region candidate in association with a reference condition.

17 Claims, 24 Drawing Sheets

(51) Int. Cl.
    *G01C 21/36*     (2006.01)
    *G06F 3/0484*     (2013.01)
    *H04W 88/02*     (2009.01)
    *H04L 29/08*     (2006.01)

(52) U.S. Cl.
    CPC .......... *G06F 3/04842* (2013.01); *G06F 16/29* (2019.01); *H04W 88/02* (2013.01); *H04L 67/18* (2013.01)

(58) Field of Classification Search
    CPC ..... G06F 3/04842; G06F 16/29; H04L 67/18; G01C 21/3617; G01C 21/3682
    See application file for complete search history.

(56) References Cited

U.S. PATENT DOCUMENTS

| | | | |
|---|---|---|---|
| 2013/0339376 A1 | 12/2013 | Takamura et al. | |
| 2015/0278712 A1* | 10/2015 | Fujita | G06Q 10/02 705/5 |
| 2017/0097985 A1* | 4/2017 | Miyahara | G06Q 30/02 |
| 2017/0230792 A1* | 8/2017 | Shaik | G06F 3/04847 |
| 2018/0067967 A1* | 3/2018 | Miyahara | G09B 29/106 |

FOREIGN PATENT DOCUMENTS

| | | |
|---|---|---|
| JP | 2008-102751 A | 5/2008 |
| JP | 2009-145234 A | 7/2009 |
| JP | 2010-277491 A | 12/2010 |

OTHER PUBLICATIONS

David et al., A location-based notification- and visualization-system indicating social activities, Multimedia on Mobile Devices 2009, Jan. 28, 2009, pp. 1-7, San Jose, California.

* cited by examiner

[ FIG. 1 ]
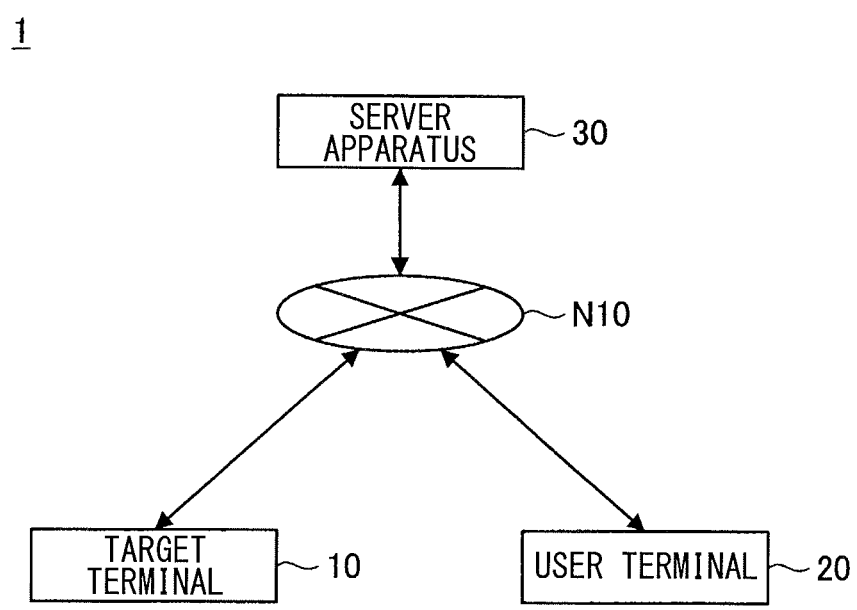

[FIG. 2]
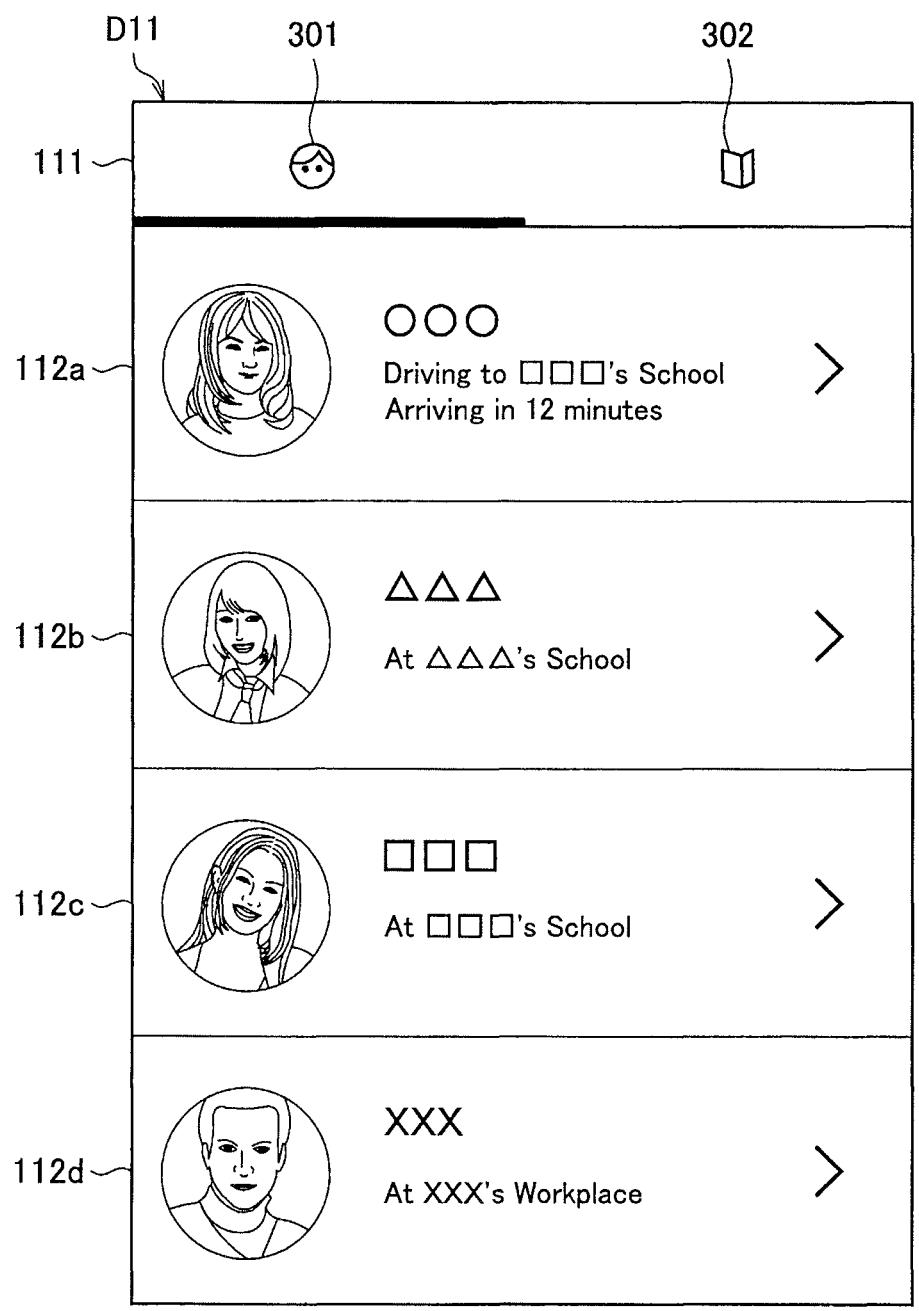

[FIG. 3]
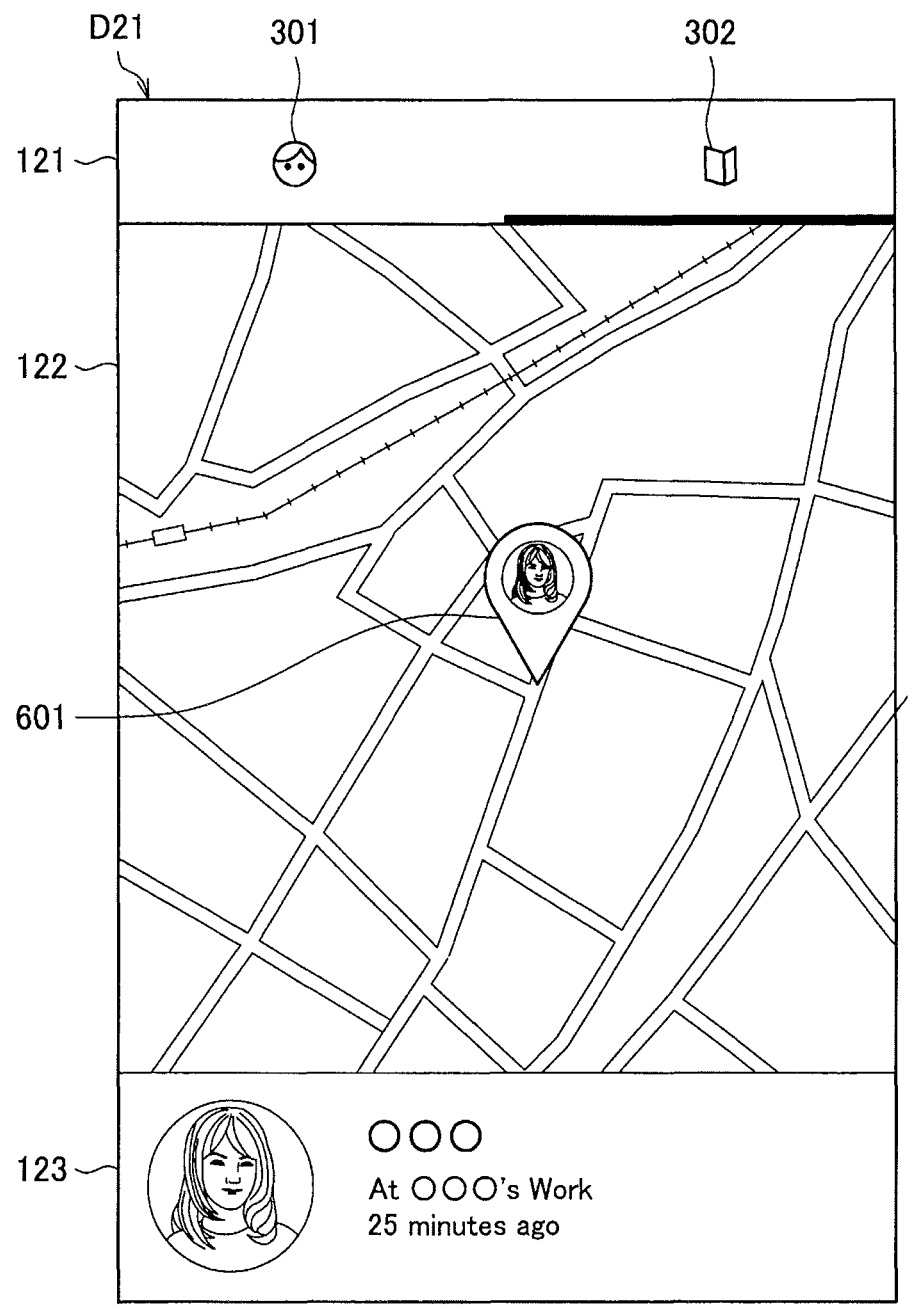

[FIG. 4]
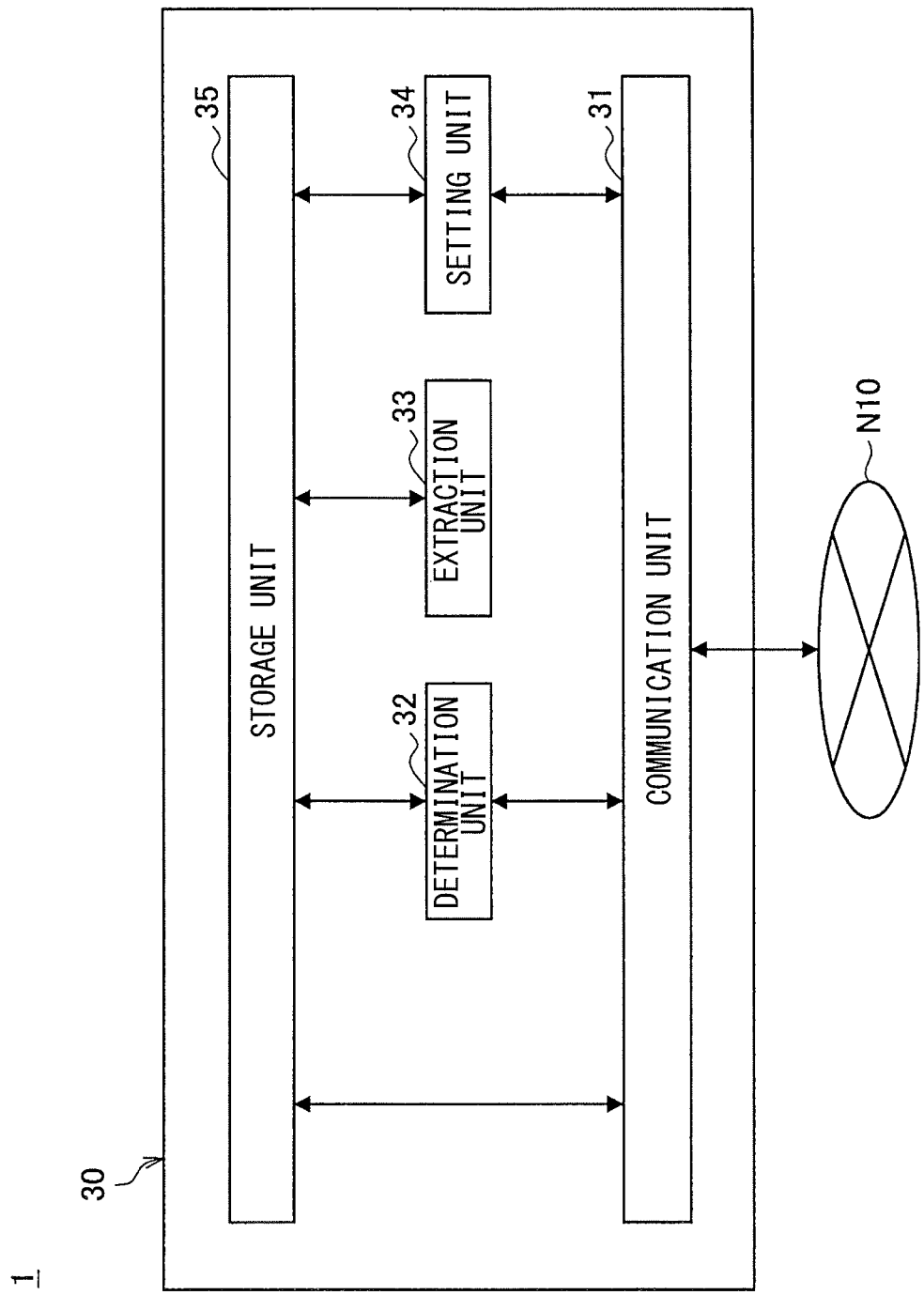

[FIG. 5]
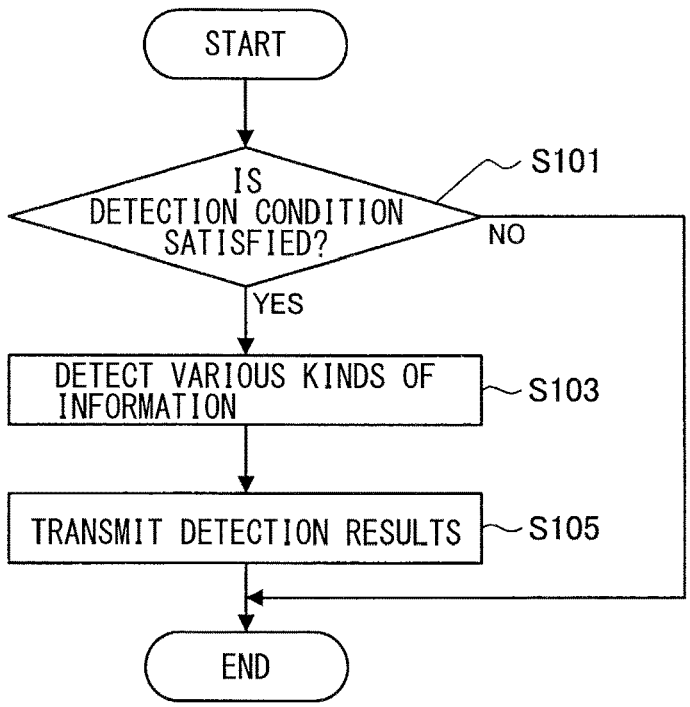
[FIG. 6]
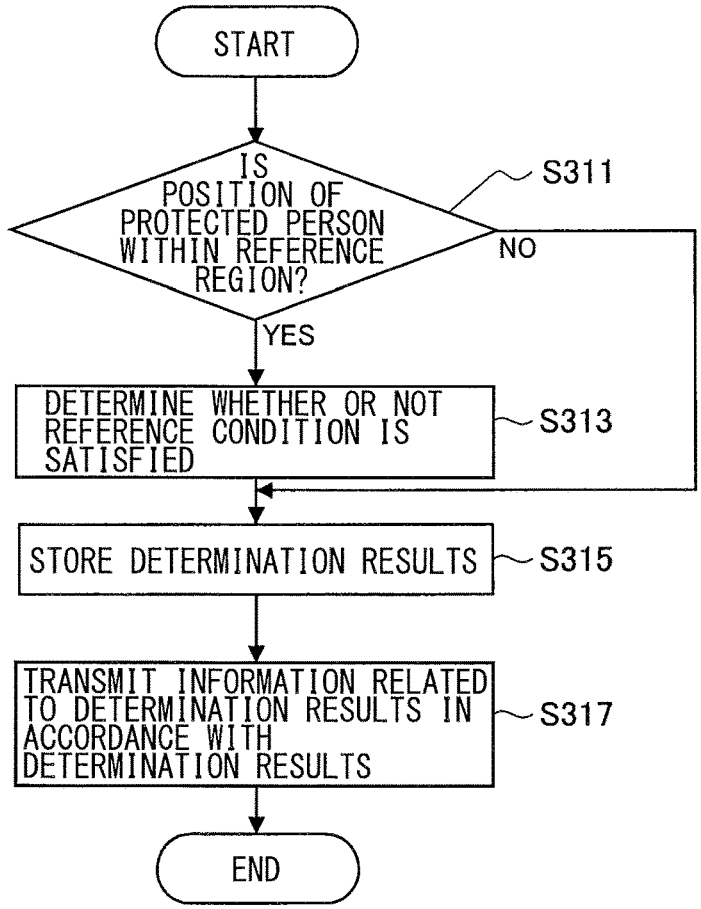

[ FIG. 7 ]

| REFERENCE REGION | REFERENCE CONDITIONS | | |
|---|---|---|---|
| | TIME CONDITION | ENVIRONMENT CONDITION | BEHAVIOR CONDITION |
| | DAY OF WEEK | WEATHER | MEANS OF MOVEMENT |
| HOME | — | — | — |
| SCHOOL | WEEKDAY | — | — |
| HOME TO SCHOOL | WEEKDAY | — | BY TRAIN |
| FRIEND'S HOUSE | SATURDAY, SUNDAY | — | — |
| HOME TO FRIEND'S HOUSE ROUTE 1 | SATURDAY, SUNDAY | FINE | ON FOOT |
| HOME TO FRIEND'S HOUSE ROUTE 2 | SATURDAY, SUNDAY | RAINY | BY BUS |

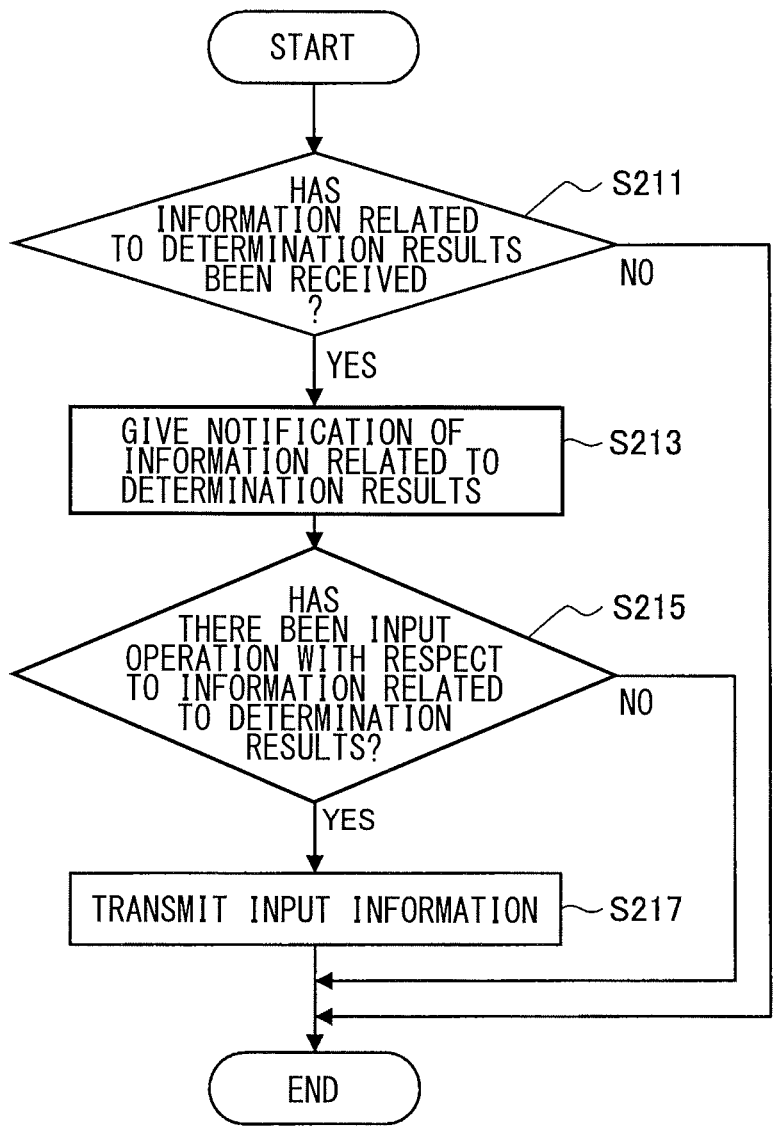
[ FIG. 8 ]

[ FIG. 9 ]
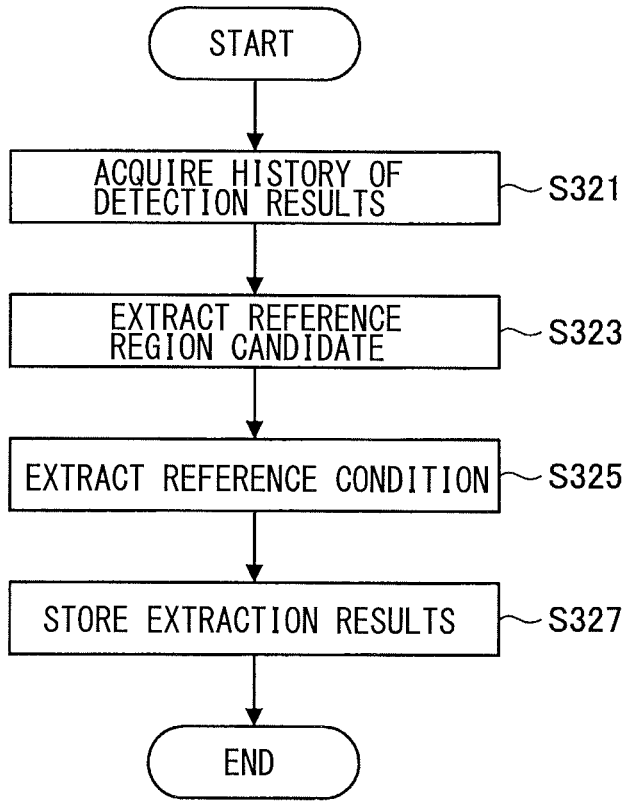
[ FIG. 10 ]
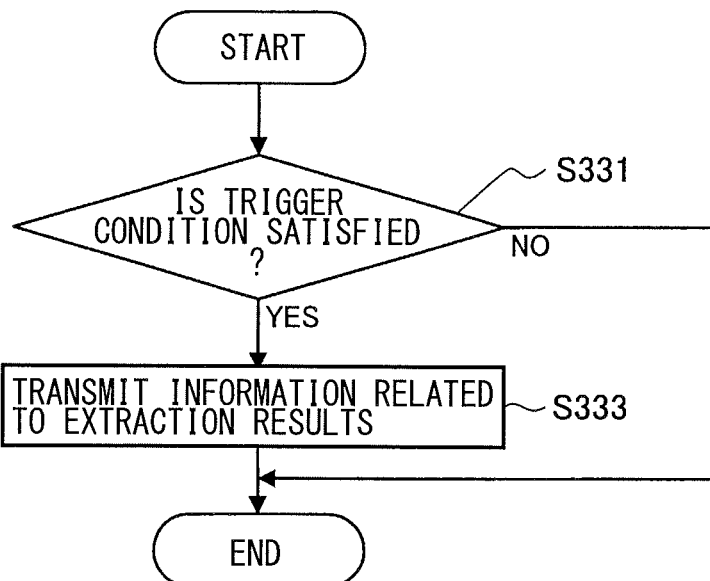

[ FIG. 11 ]
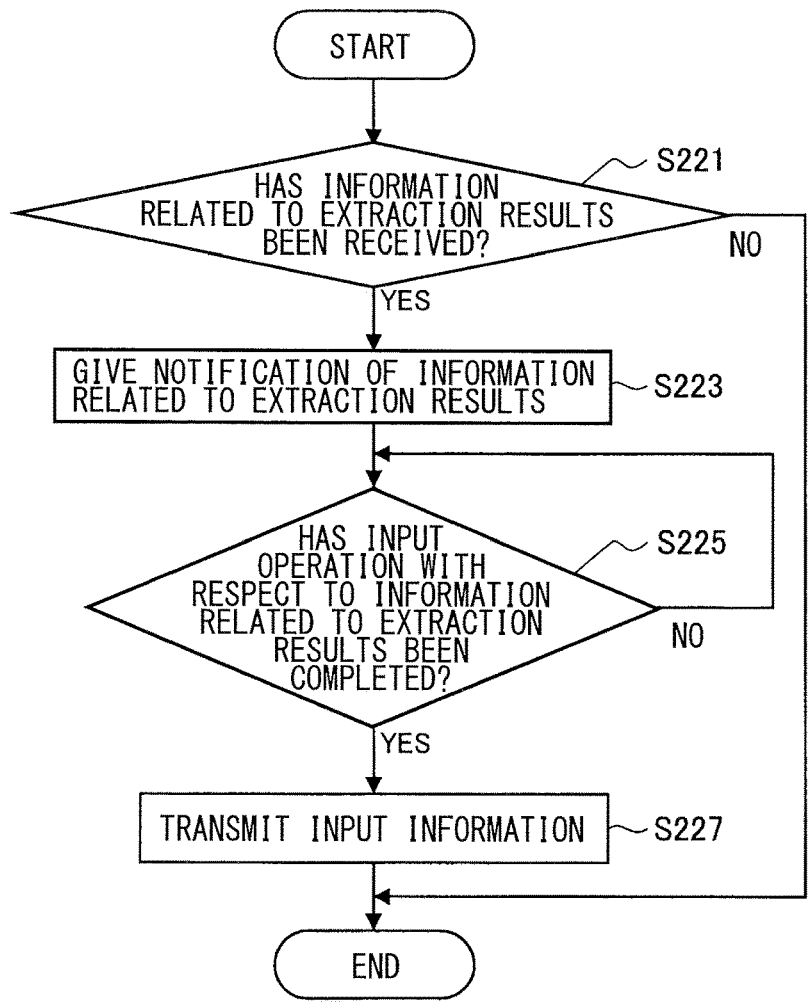
[ FIG. 12 ]
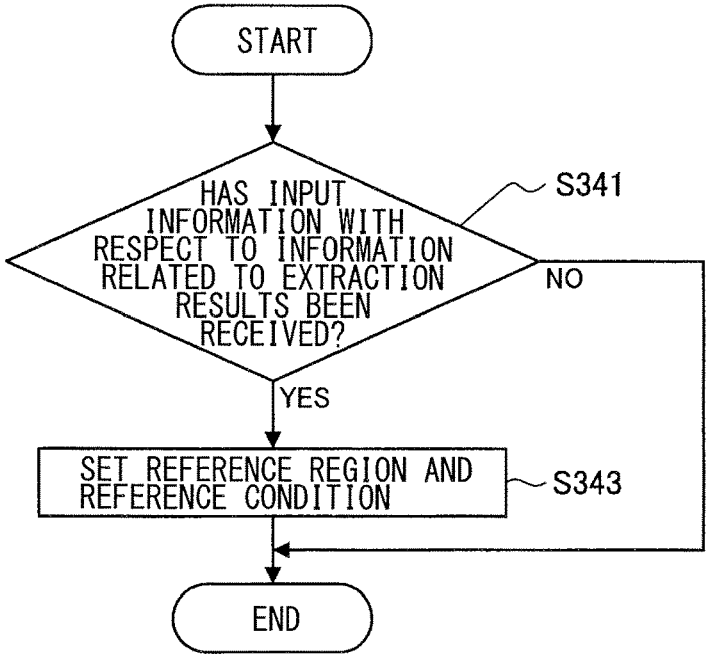

[ FIG. 13 ]
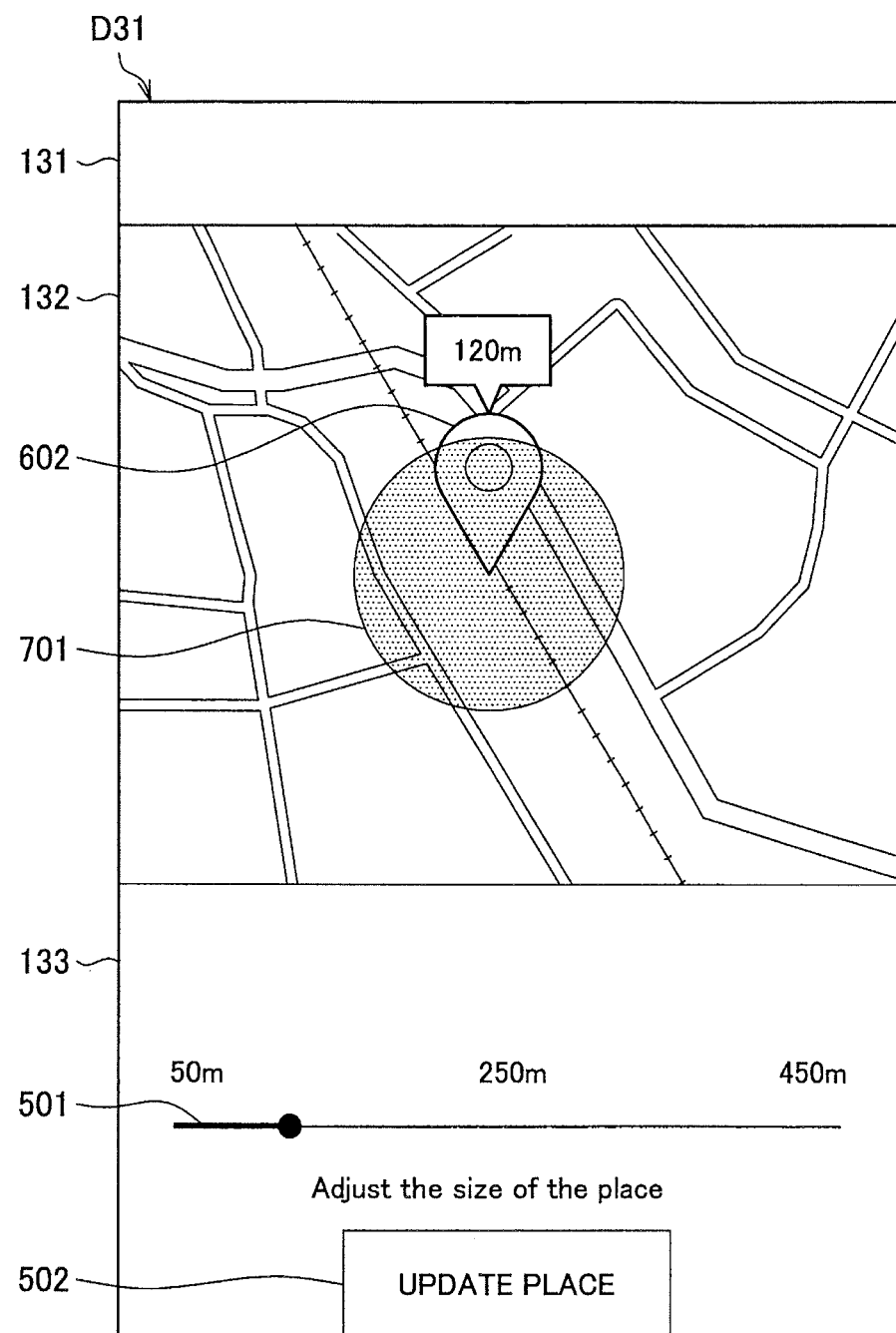

[ FIG. 14 ]
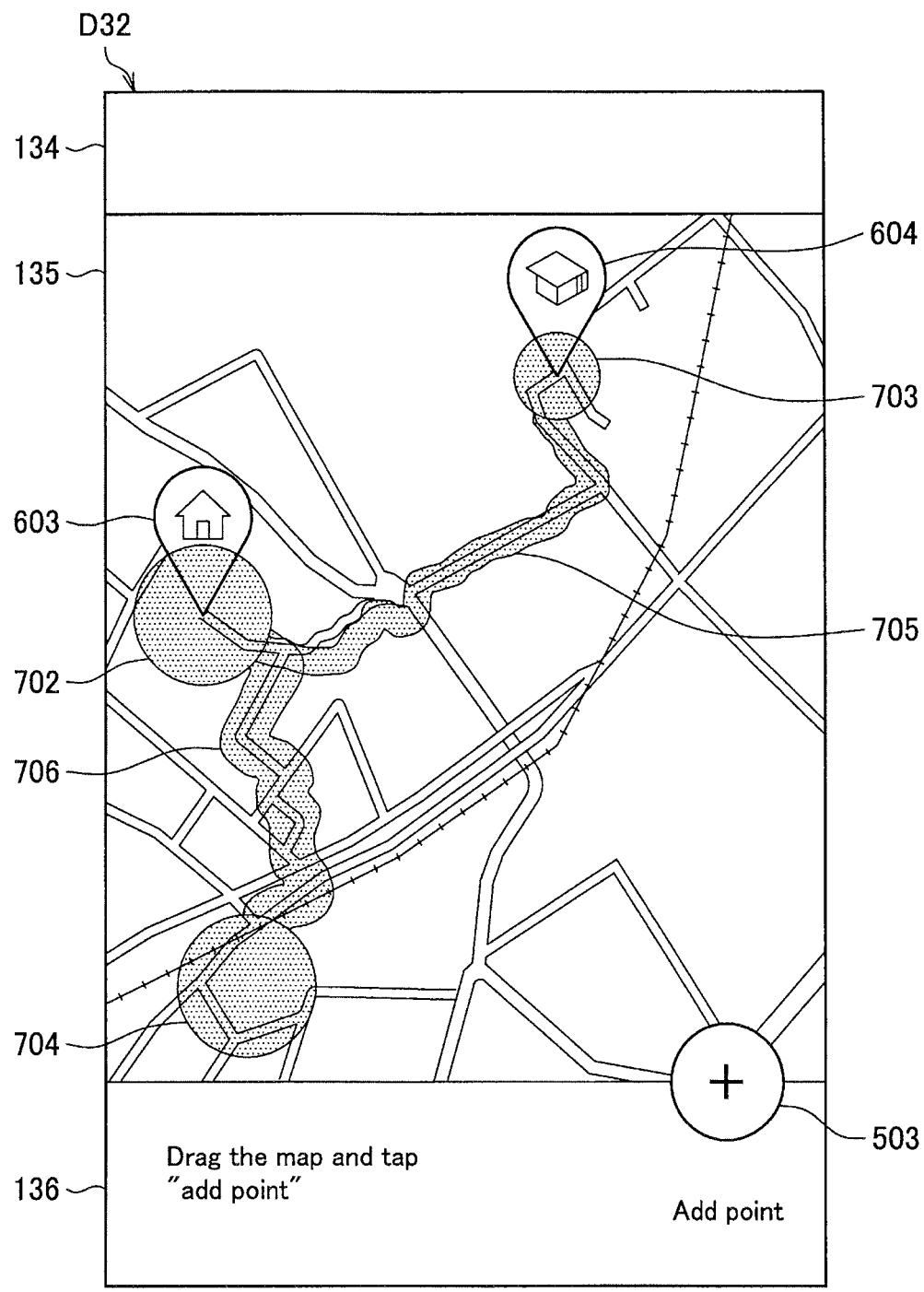

[ FIG. 15 ]
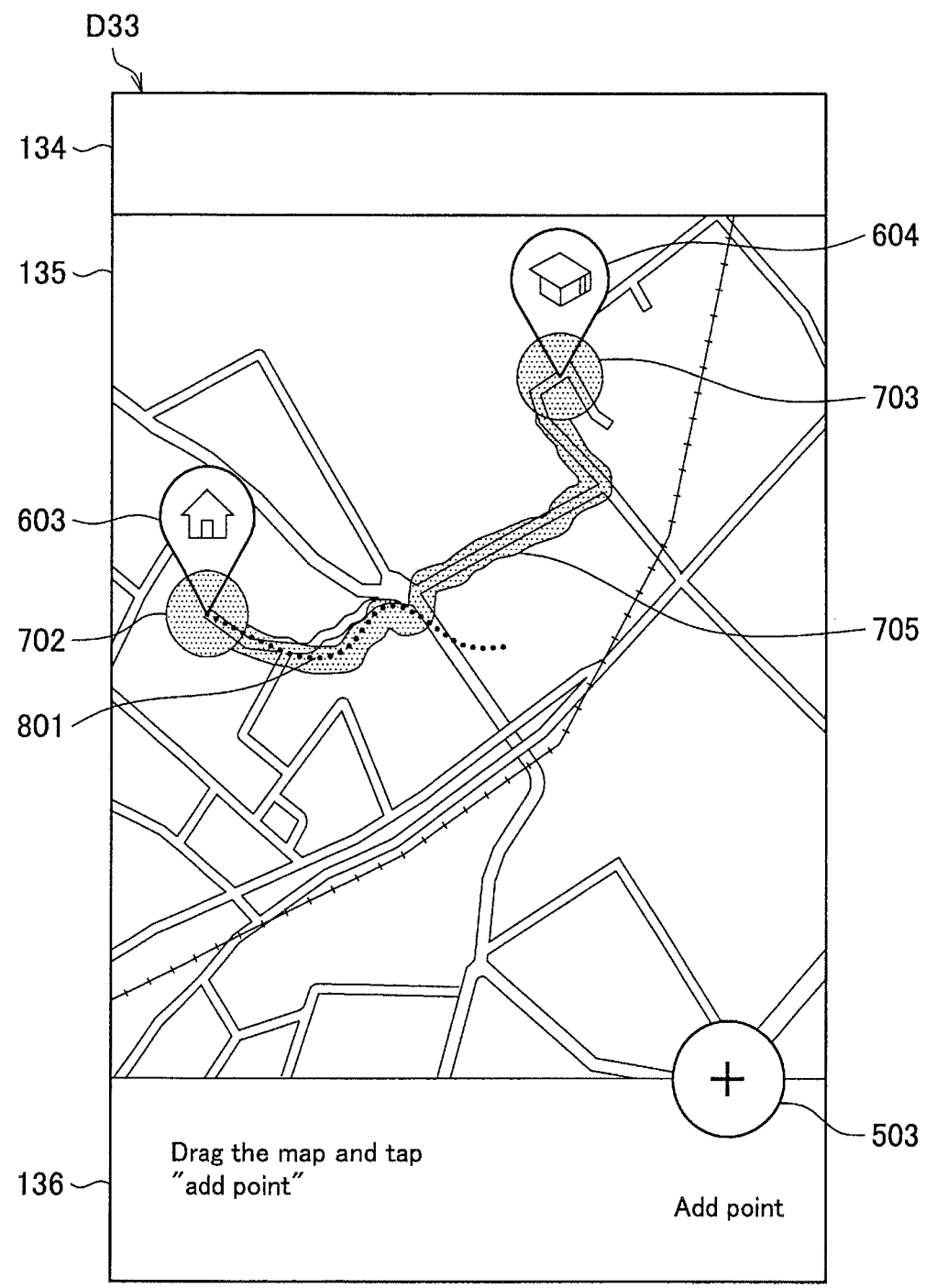

[ FIG. 16 ]
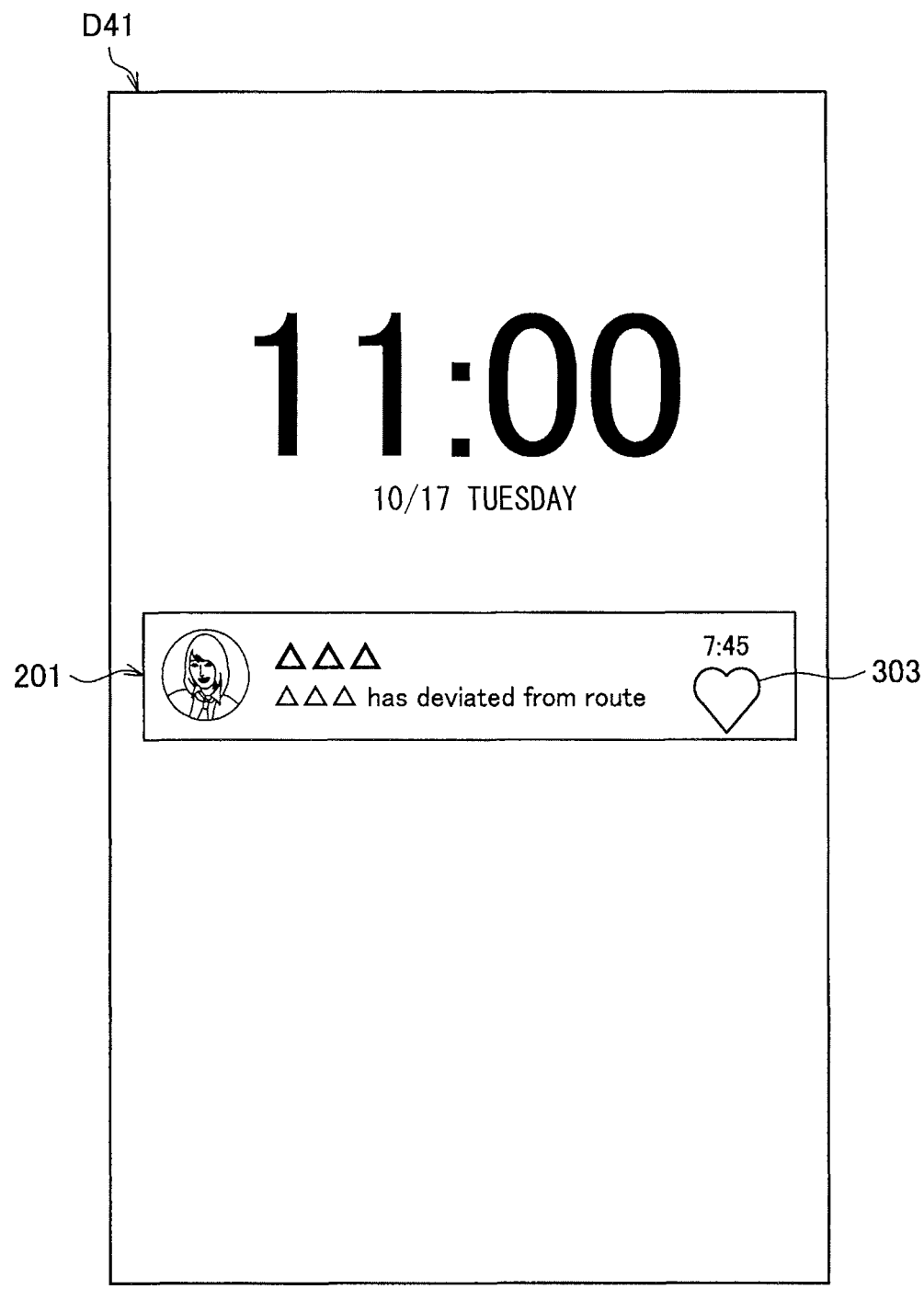

[ FIG. 17 ]
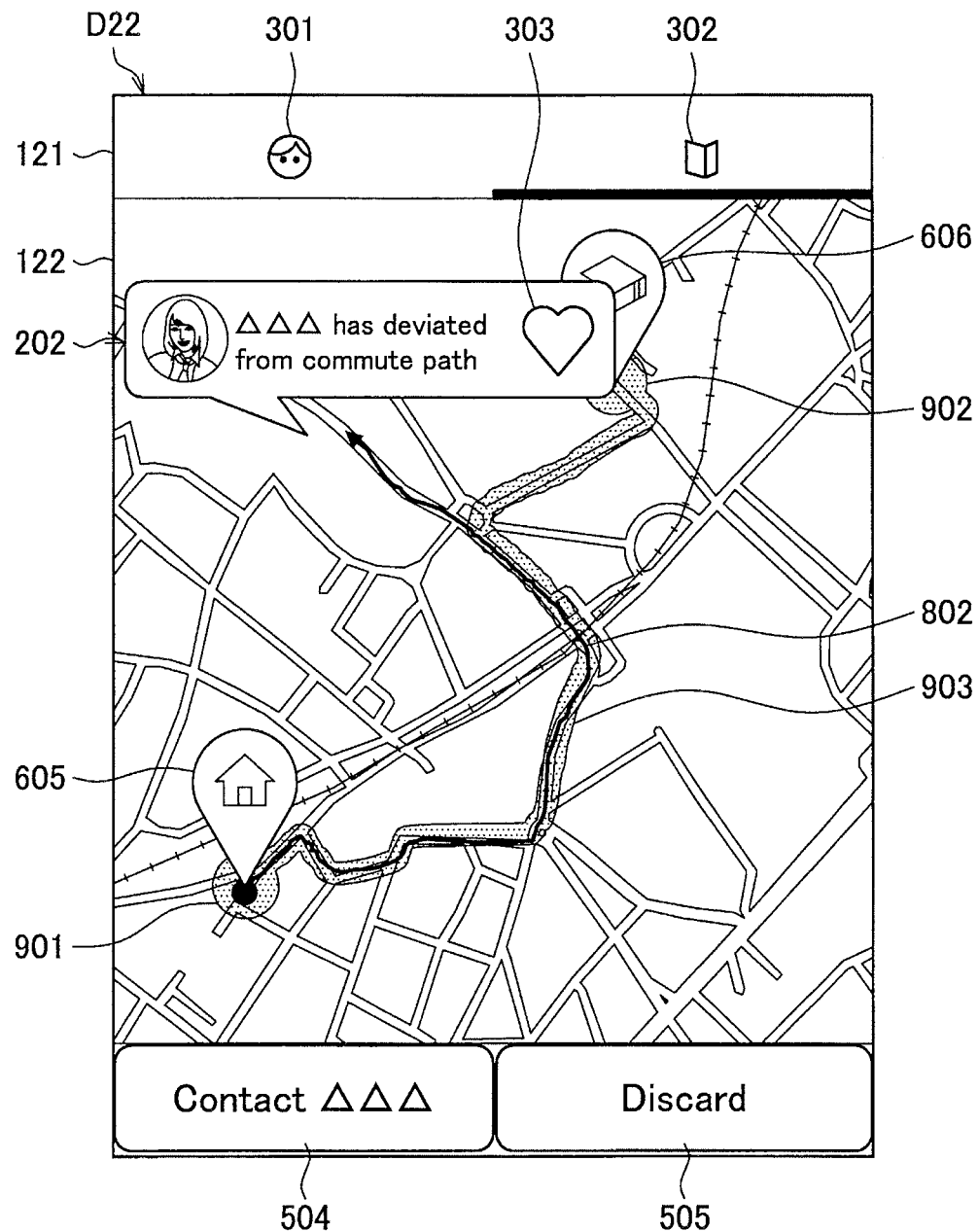

[ FIG. 18 ]
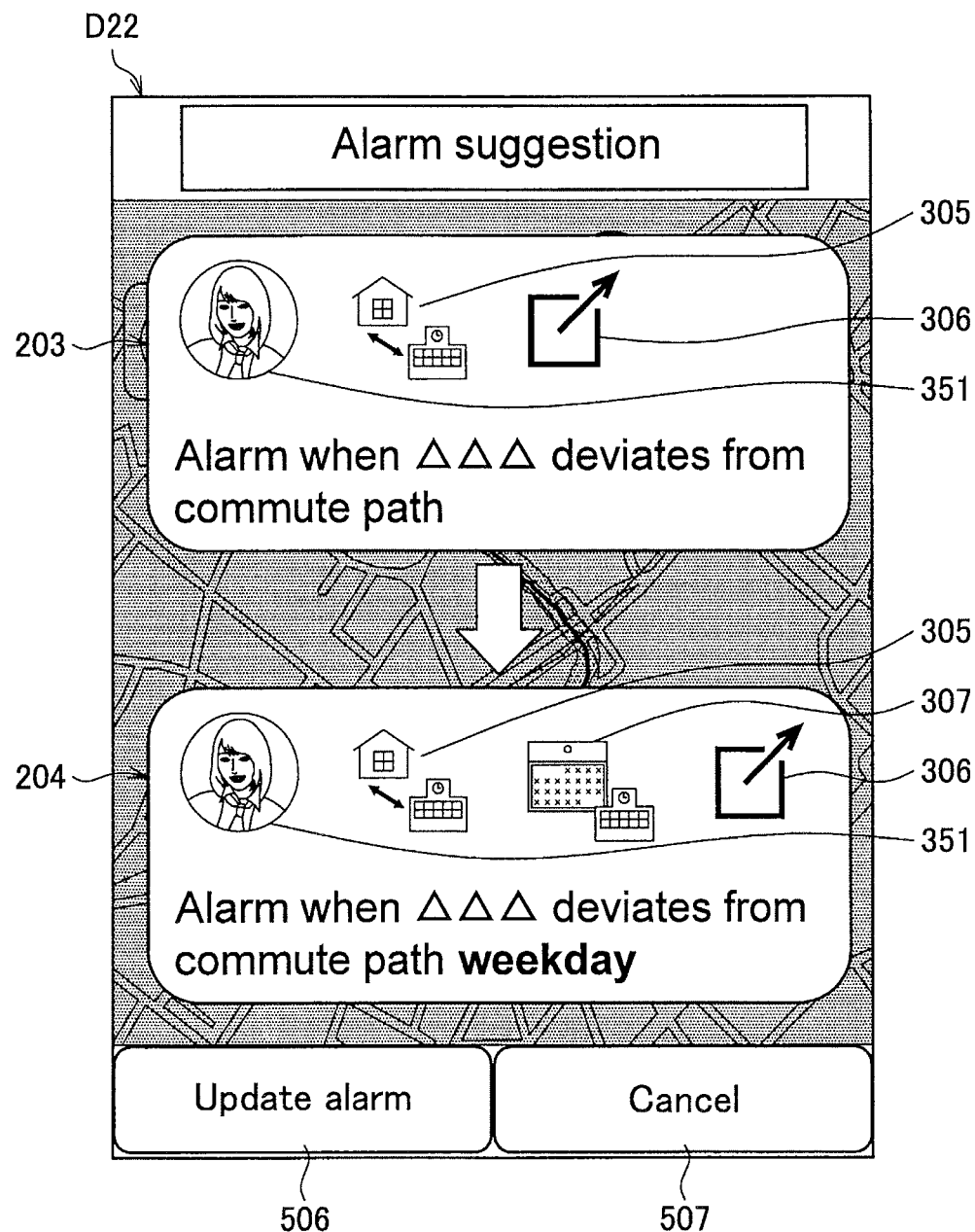

[ FIG. 19 ]
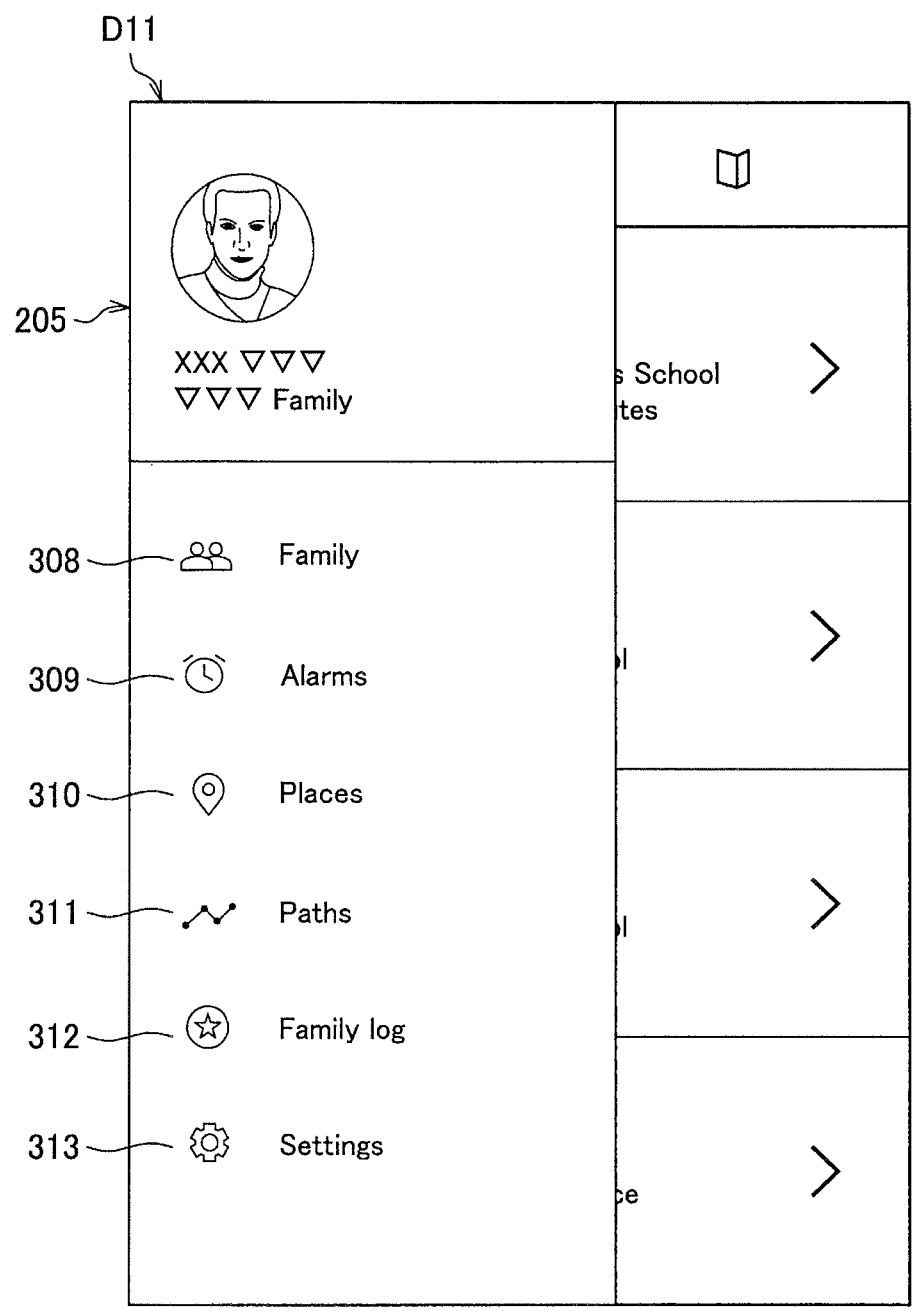

[FIG. 20]
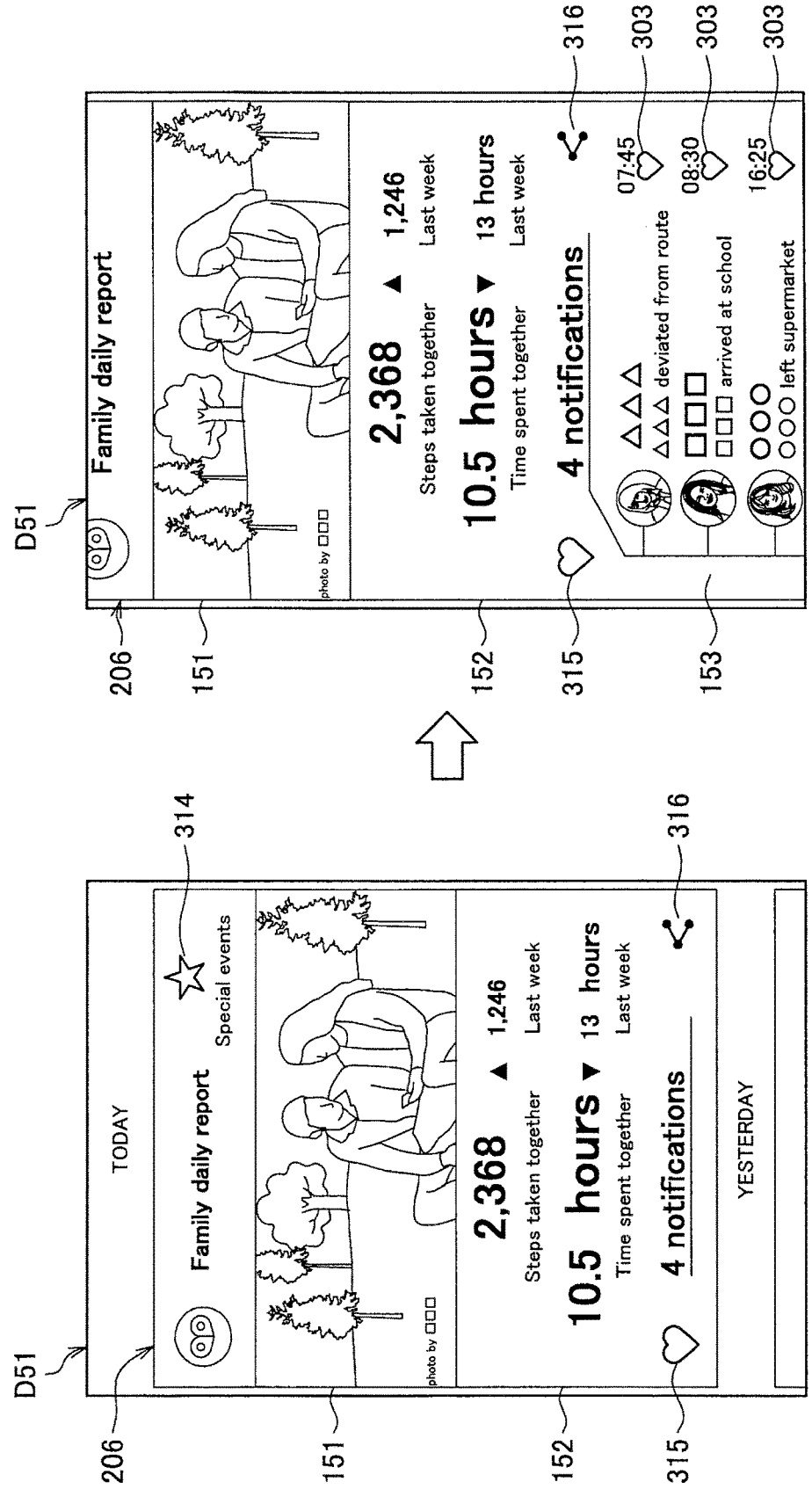

[ FIG. 21 ]
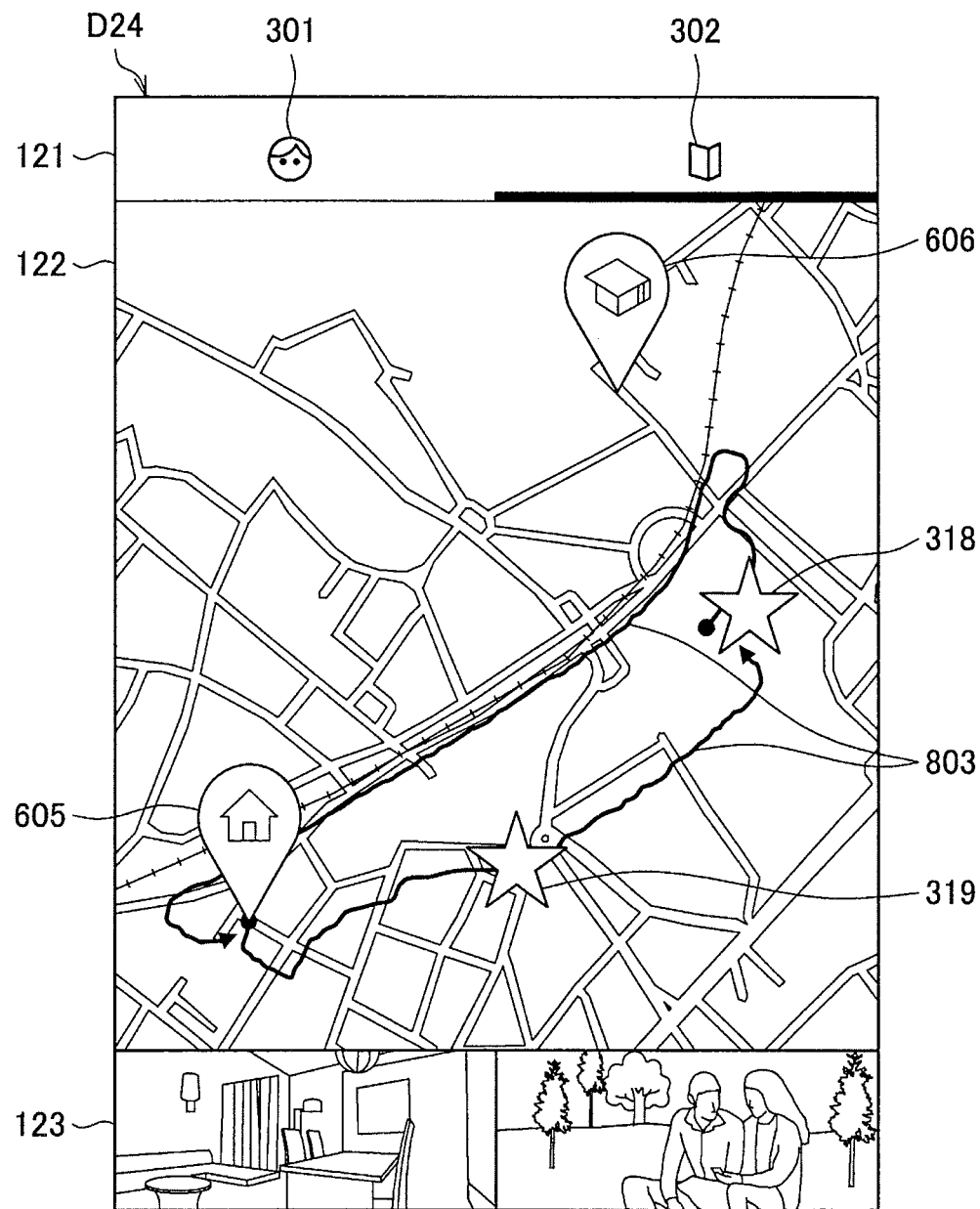

[ FIG. 22 ]
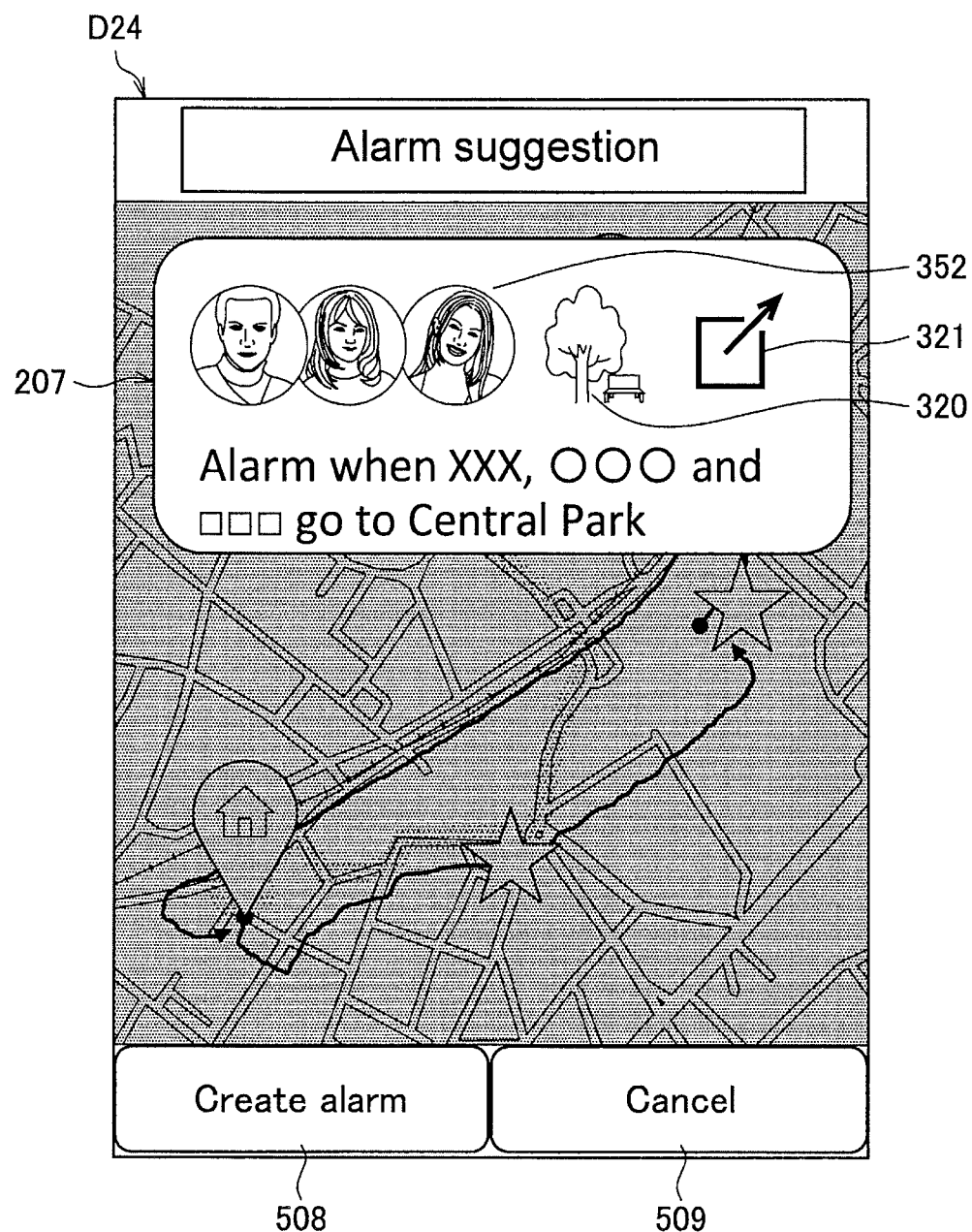

[FIG. 23]
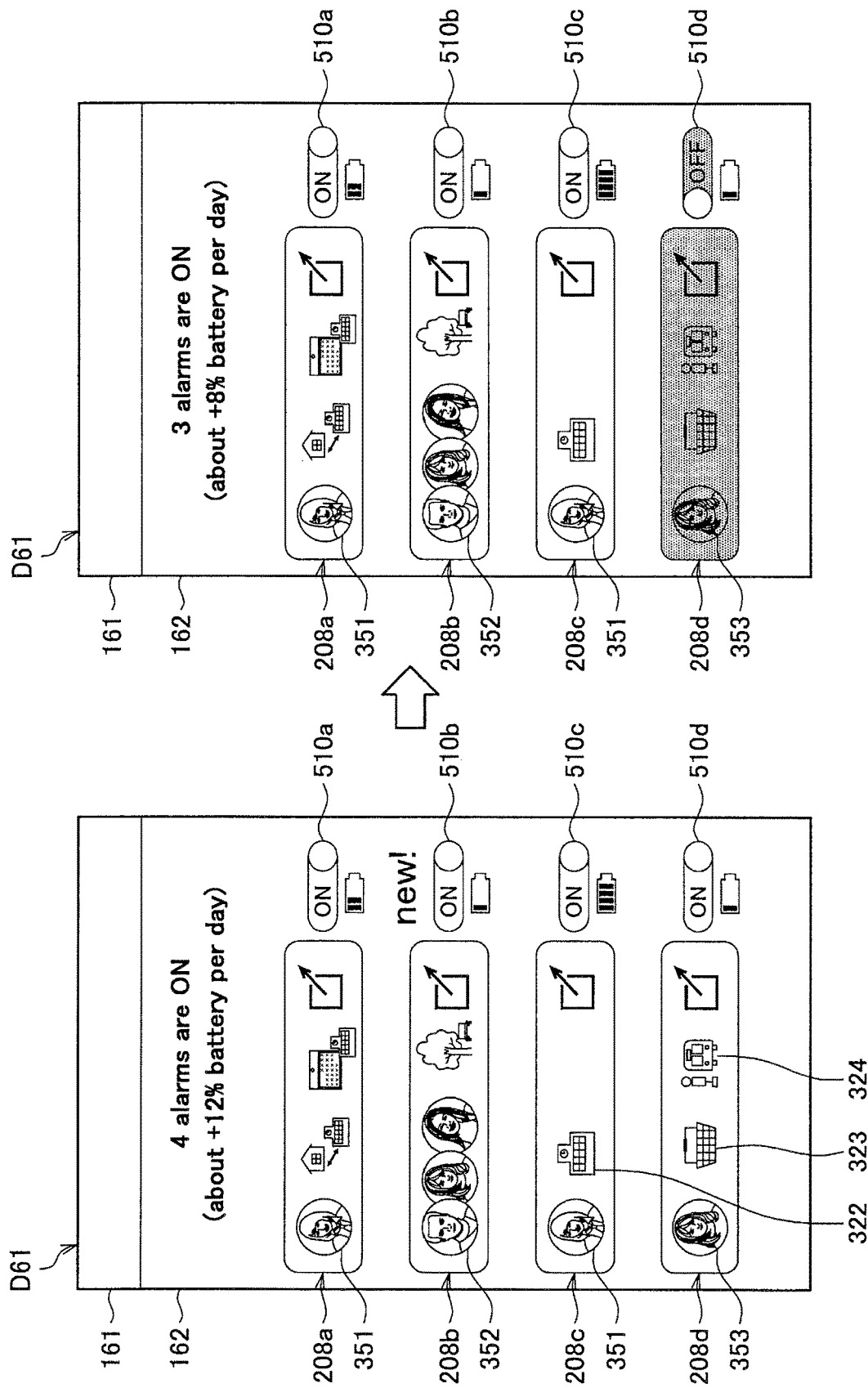

[FIG. 24]
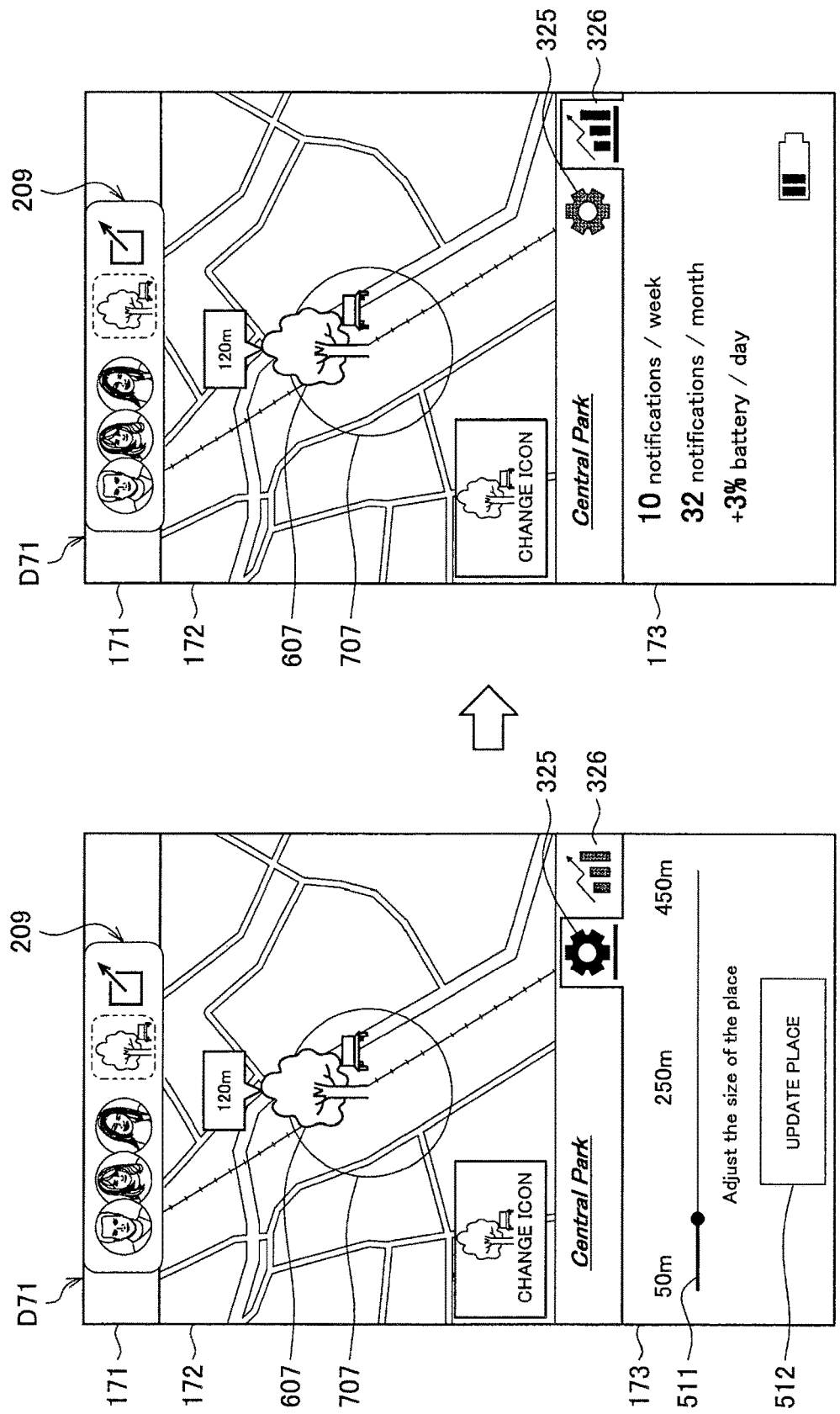

[ FIG. 25 ]
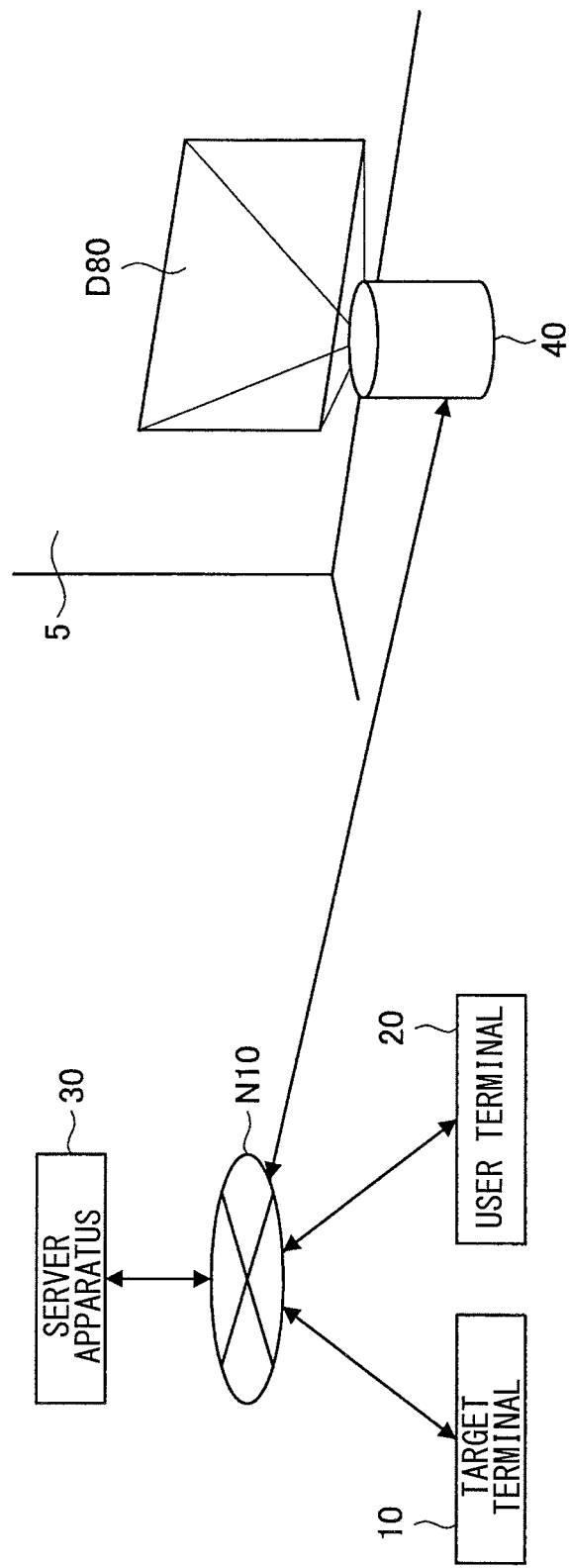

[ FIG. 26 ]
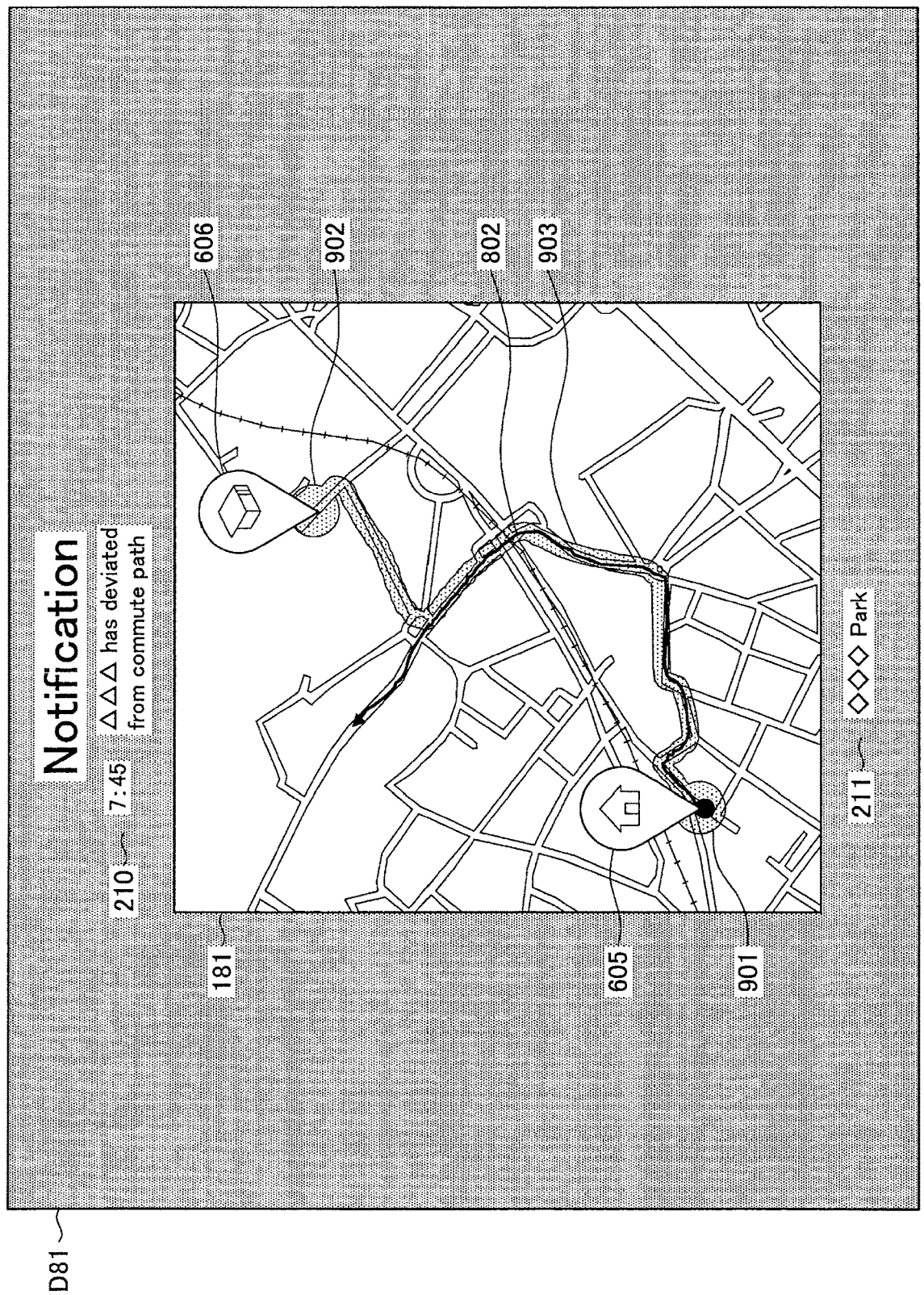

[ FIG. 27 ]
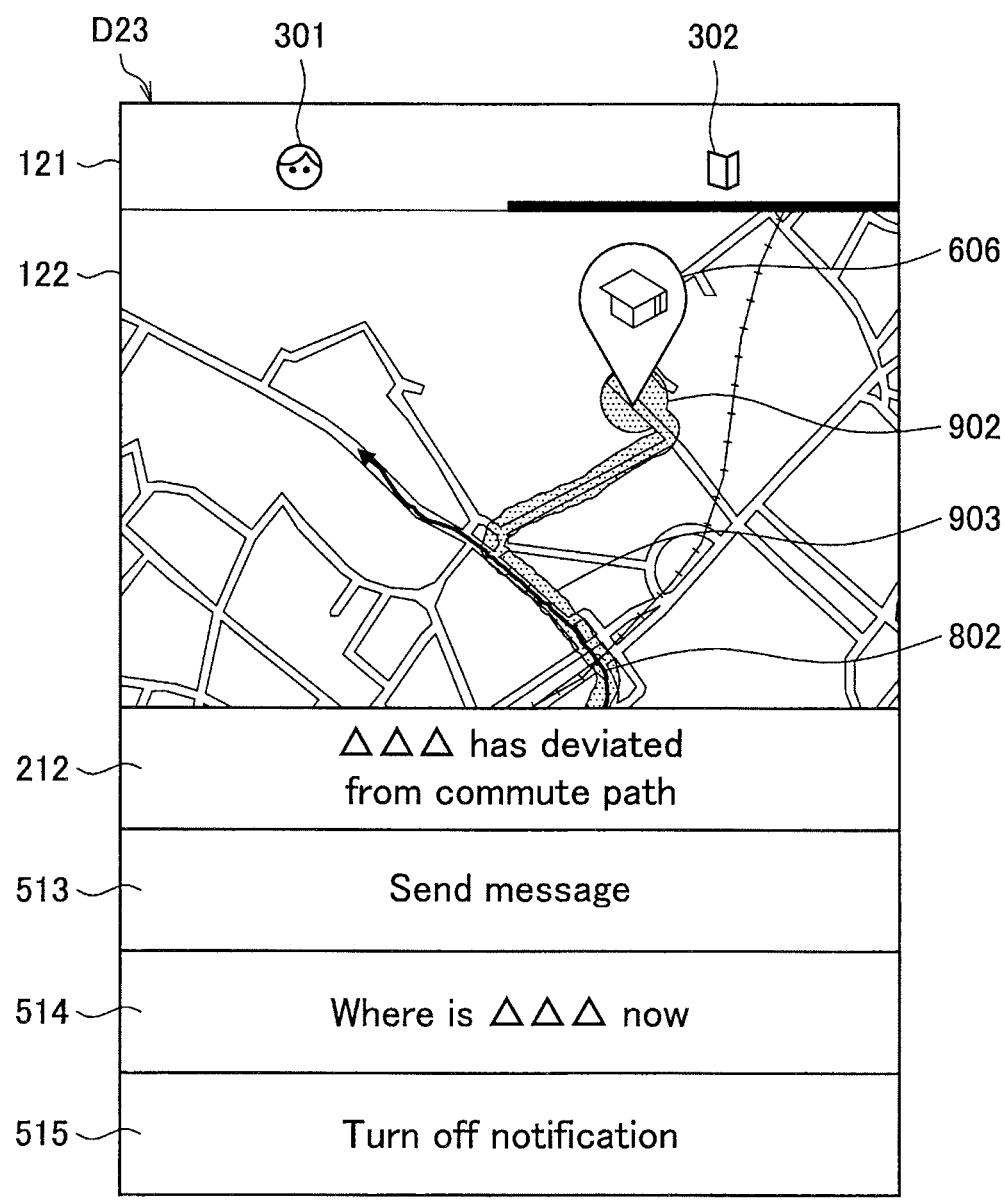

INFORMATION PROCESSING APPARATUS, INFORMATION PROCESSING METHOD, AND PROGRAM FOR DETERMINING A POSITION OF A TARGET IN RELATION TO A REFERENCE REGION

CROSS REFERENCE TO PRIOR APPLICATION

This application is a National Stage Patent Application of PCT International Patent Application No. PCT/JP2018/013280 (filed on Mar. 29, 2018) under 35 U.S.C. § 371, which claims priority to Japanese Patent Application Nos. 2017-084834 (filed on Apr. 21, 2017) and 2018-001585 (filed on Jan. 10, 2018) which are all hereby incorporated by reference in their entirety.

TECHNICAL FIELD

The present disclosure relates to an information processing apparatus, an information processing method, and a program.

BACKGROUND ART

Information processing systems that provide various services using position information indicating the position of a target have been used.

For example, PTL 1 discloses a technology of displaying guide information, which is information related to a facility corresponding to a designated location, in a navigation system that performs route guidance to a destination on the basis of the current position information of an operator.

CITATION LIST

Patent Literature

PTL 1: Japanese Unexamined Patent Application Publication No. 2009-145234

SUMMARY OF THE INVENTION

Problem to be Solved by the Invention

Incidentally, information processing systems that use position information of a target include a watch-over system for monitoring whether or not a state including a position of the target is a normal state. Specifically, in the watch-over system, it is determined whether or not the position of the target is within a reference region, which is a geographic region. Using such a watch-over system makes it possible to, for example, notify a user such as a protector that a target such as a protected person has moved from within a reference region where the target is often located at normal times, such as around home or around school, to outside the reference region. Incidentally, in the watch-over system, a user such as a protector has to perform setting related to a reference region in some cases. This can increase human burdens in setting work for the watch-over system.

Hence, the present disclosure proposes a novel and improved information processing apparatus, information processing method, and program that make it possible to reduce human burdens in setting work for a watch-over system.

Means for Solving the Problem

According to the present disclosure, there is provided an information processing apparatus including: a determination unit that determines whether or not a position of a target is within a reference region, the reference region being a geographic region; an extraction unit that extracts a reference region candidate as a candidate for the reference region; and an output unit that outputs information related to the extracted reference region candidate in association with a reference condition.

Further, according to the present disclosure, there is provided an information processing method including: determining whether or not a position of a target is within a reference region, the reference region being a geographic region; extracting a reference region candidate as a candidate for the reference region; and outputting, by an information processing apparatus, information related to the extracted reference region candidate in association with a reference condition.

Further, according to the present disclosure, there is provided a program causing a computer to function as: a determination unit that determines whether or not a position of a target is within a reference region, the reference region being a geographic region, an extraction unit that extracts a reference region candidate as a candidate for the reference region; and an output unit that outputs information related to the extracted reference region candidate in association with a reference condition.

Effects of the Invention

As described above, according to the present disclosure, it is possible to reduce the human burdens in the setting work for the watch-over system.

Noted that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a schematic diagram illustrating an example of a schematic configuration of a watch-over system according to an embodiment of the present disclosure.

FIG. 2 is an explanatory diagram illustrating an example of a status screen displayed by a user terminal according to the embodiment.

FIG. 3 is an explanatory diagram illustrating an example of a map screen displayed by the user terminal according to the embodiment.

FIG. 4 is a block diagram illustrating an example of a functional configuration of a server apparatus according to the embodiment.

FIG. 5 is a flowchart illustrating an example of a flow of a detection process performed by a target terminal according to the embodiment.

FIG. 6 is a flowchart illustrating an example of a flow of a determination process performed by the server apparatus according to the embodiment.

FIG. 7 is an explanatory diagram illustrating examples of a reference region and a reference condition set in the server apparatus according to the embodiment.

FIG. 8 is a flowchart illustrating an example of a flow of a determination result notification process performed by the user terminal according to the embodiment.

FIG. 9 is a flowchart illustrating an example of a flow of an extraction process performed by the server apparatus according to the embodiment.

FIG. 10 is a flowchart illustrating an example of a flow of an extraction result transmission process performed by the server apparatus according to the embodiment.

FIG. 11 is a flowchart illustrating an example of a flow of an extraction result notification process performed by the user terminal according to the embodiment.

FIG. 12 is a flowchart illustrating an example of a flow of a setting process performed by the server apparatus according to the embodiment.

FIG. 13 is an explanatory diagram illustrating a first example of a setting screen displayed by the user terminal according to the embodiment.

FIG. 14 is an explanatory diagram illustrating a second example of a setting screen displayed by the user terminal according to the embodiment.

FIG. 15 is an explanatory diagram illustrating a third example of a setting screen displayed by the user terminal according to the embodiment.

FIG. 16 is an explanatory diagram illustrating an example of a home screen displayed by the user terminal according to the embodiment at the time of determination result notification.

FIG. 17 is an explanatory diagram illustrating an example of a map screen displayed by the user terminal according to the embodiment at the time of determination result notification.

FIG. 18 is an explanatory diagram illustrating an example of a suggested change to a determination result notification setting displayed by the user terminal according to the embodiment.

FIG. 19 is an explanatory diagram illustrating an example of a menu displayed by the user terminal or the like according to the embodiment.

FIG. 20 is an explanatory diagram illustrating an example of a history screen displayed by the user terminal or the like according to the embodiment.

FIG. 21 is an explanatory diagram illustrating an example of a map screen displayed by the user terminal or the like according to the embodiment at the time of event presentation.

FIG. 22 is an explanatory diagram illustrating an example of an event notification setting displayed by the user terminal or the like according to the embodiment.

FIG. 23 is an explanatory diagram illustrating an example of a notification setting list screen displayed by the user terminal or the like according to the embodiment.

FIG. 24 is an explanatory diagram illustrating an example of a setting screen for an event notification setting displayed by the user terminal or the like according to the embodiment.

FIG. 25 is a schematic diagram illustrating an example of a schematic configuration of a watch-over system according to an application example.

FIG. 26 is an explanatory diagram illustrating an example of a map screen displayed by an agent apparatus according to the application example at the time of determination result notification.

FIG. 27 is an explanatory diagram illustrating an example of a map screen displayed by a user terminal at the time of determination result notification.

MODES FOR CARRYING OUT THE INVENTION

Hereinafter, (a) preferred embodiment(s) of the present disclosure is described in detail with reference to the appended drawings. It is to be noted that, in this specification and the appended drawings, components that have substantially the same function and configuration are denoted with the same reference numerals, thereby refraining from repeatedly describing these components.

Note that the description will be given in the following order.
1. Configuration of Watch-Over System
2. Operation of Watch-Over System
2-1. Detection Process
2-2. Determination Process
2-3. Determination Result Notification Process
2-4. Extraction Process
2-5. Extraction Result Transmission Process
2-6. Extraction Result Notification Process
2-7. Setting Process
2-8. Display Examples of Various Screens
2-8-1. Display Examples of Setting Screen
2-8-2. Display Examples of Screens Related to Determination Result Notification
2-8-3. Display Example of History Screen
2-8-4. Display Examples of Screens Related to Events
3. Effects of Watch-Over System
4. Application Example
5. Conclusion

1. Configuration of Watch-Over System

First, referring to FIGS. 1 to 4, a configuration of a watch-over system 1 according to an embodiment of the present disclosure will be described.

FIG. 1 is a schematic diagram illustrating an example of a schematic configuration of the watch-over system 1 according to the present embodiment. FIG. 2 is an explanatory diagram illustrating an example of a status screen displayed by a user terminal 20 according to the present embodiment. FIG. 3 is an explanatory diagram illustrating an example of a map screen displayed by the user terminal 20 according to the present embodiment. FIG. 4 is a block diagram illustrating an example of a functional configuration of a server apparatus 30 according to the present embodiment.

The watch-over system 1 is, for example, an information processing system including a target terminal 10, the user terminal 20, and the server apparatus 30, as illustrated in FIG. 1. The target terminal 10, the user terminal 20, and the server apparatus 30 communicate with each other via a wired or wireless information network N10. Note that the number of the target terminals 10 and the user terminals 20 in the watch-over system 1 is not limited to the example illustrated in the drawing, and may be two or more, for example. Hereinafter, to facilitate understanding, an example in which the watch-over system 1 includes one target terminal 10 and one user terminal 20 will be mainly described.

The target terminal 10 is an example of an apparatus to be carried by a protected person whose state is to be monitored by the watch-over system 1. The protected person corresponds to an example of a target according to the present disclosure. The target terminal 10 detects at least position information of the protected person and transmits detection results. The target terminal 10 may also detect other information different from the position information of the protected person and transmit detection results.

The target terminal 10 may be, for example, an information processing terminal such as a smartphone or a tablet terminal. Note that the apparatus to be carried by the protected person is not limited to an information processing terminal such as the target terminal 10 described above, as long as it has a function of detecting and transmitting various kinds of information including the position information of the protected person. For example, a sensor itself may be used as the apparatus to be carried by the protected person, the sensor being able to detect various kinds of information including the position information of the protected person, as will be described later.

The user terminal 20 is an example of an apparatus to be used by the protector who monitors the state of the protected person. The protector corresponds to an example of a user according to the present disclosure. The user terminal 20 notifies the protector of information transmitted from the server apparatus 30. For example, the user terminal 20 notifies the protector by visually displaying the information. In addition, the user terminal 20 accepts input information, which is information inputted from the protector, and transmits the input information to the server apparatus 30. Note that the user terminal 20 may detect position information of the protector and transmit a detection result. Further, like the target terminal 10, the user terminal 20 may detect a variety of other information different from the position information of the protector and transmit detection results.

The user terminal 20 may be, for example, an information processing terminal such as a personal computer, a smartphone, or a tablet terminal. Note that the user terminal 20 is not limited to the above information processing terminal as long as it has a function of notifying the protector, accepting input information, and transmitting input information.

The user terminal 20 may display a status screen D11 illustrated in FIG. 2 or a map screen D21 illustrated in FIG. 3, in response to an input operation by the protector.

The status screen D11 shows, for example, display regions 112a, 112b, 112c, and 112d in which the current positions of members of a family to which the protector belongs are displayed by text or the like, for example. The display regions 112a and 112d are regions in which the current positions of members corresponding to protectors each using the user terminal 20 are displayed. The display regions 112b and 112c are regions in which the current positions of members corresponding to protected persons each using the target terminal 10 are displayed. The user terminal 20 may receive position information of a protected person transmitted from the target terminal 10 and position information of a protector transmitted from another user terminal 20. Thus, the user terminal 20 may update the current positions of the members displayed in the respective display regions.

In addition, the map screen D21 shows, for example, a display region 122 in which an icon 601 indicating a position of a family member is displayed superimposed on a map. Also shown below the display region 122 is a display region 123 in which the current position of the member corresponding to the icon 601 is displayed, for example, by text or the like.

Note that at the top of the status screen D11 and the map screen D12 are shown display regions 111 and 121, respectively, in which an icon 301 indicating that the currently displayed screen is the status screen D11 and an icon 302 indicating that the currently displayed screen is the map screen D12 are displayed. The screen corresponding to the icon highlighted by underlining or the like corresponds to the currently displayed screen. In addition, for example, the members of the family to which the protector belongs are registered in advance, and each member is able to grasp positions of the family members including him/herself by referring to a status screen D40 and a map screen D50 by using a terminal used by him/herself.

The protector is able to grasp a position of the protected person by referring to the status screen D11 and the map screen D12, but it is difficult to constantly monitor the position of the protected person. Here, the server apparatus 30 transmits a determination result indicating whether or not the position of the protected person is within a reference region, which is a geographical region, to the user terminal 20, which enables the protector to grasp whether or not the position of the protected person is in a normal state, as will be described later.

The server apparatus 30 corresponds to an example of an information processing apparatus according to the present disclosure. The server apparatus 30 includes a CPU (Central Processing Unit), which is an arithmetic processing unit, a ROM (Read Only Memory), which is a storage device that stores programs, arithmetic processing parameters, and the like to be used by the CPU, a RAM (Random Access Memory), which is a storage device that temporarily stores parameters and the like that change as appropriate in execution of the CPU, and the like.

For example, the server apparatus 30 includes a communication unit 31, a determination unit 32, an extraction unit 33, a setting unit 34, and a storage unit 35, as illustrated in FIG. 4.

The communication unit 31 communicates with an external apparatus via the information network N10. The communication unit 31 corresponds to an example of an output unit according to the present disclosure. For example, the communication unit 31 transmits determination results by the determination unit 32 to the user terminal 20. Further, for example, the communication unit 31 transmits extraction results by the extraction unit 33 to the user terminal 20.

The determination unit 32 executes a determination process such as determining whether or not the position of the protected person is within the reference region.

The extraction unit 33 executes an extraction process such as extracting reference region candidates as candidates for the reference region.

The setting unit 34 executes a setting process in the watch-over system 1, such as setting of the reference region.

The storage unit 35 stores data that is referred to for various processes performed by the server apparatus 30. For example, the storage unit 35 stores information received by the communication unit 31. For example, the storage unit 35 also stores determination results by the determination unit 32. For example, the storage unit 35 also stores extraction results by the extraction unit 33. For example, the storage unit 35 also stores information set by the setting unit 34.

2. Operation of Watch-Over System

Next, referring to FIGS. 5 to 15, the operation of the watch-over system 1 according to the present embodiment will be described.

(2-1. Detection Process)

FIG. 5 is a flowchart illustrating an example of a flow of a detection process performed by the target terminal 10 according to the embodiment. The process flow illustrated in FIG. 5 is constantly repeated, for example.

When the process flow illustrated in FIG. 5 is started, first, in step S101, the target terminal 10 determines whether or not a detection condition is satisfied. In a case where it is determined that the detection condition is satisfied (step S101/YES), the process proceeds to step S103. On the other hand, in a case where it is determined that the detection condition is not satisfied (step S101/NO), the process flow illustrated in FIG. 5 ends.

The detection condition may differ depending on information to be detected. For example, the detection condition may be that a preset set time (e.g., one minute) has elapsed. Further, for example, the detection condition may be that a specific application has been started in the target terminal 10. The detection condition may be set as appropriate on the basis of a viewpoint such as power saving.

In step S103, the target terminal 10 detects various kinds of information including the position information of the protected person.

Specifically, the target terminal 10 may include one or more sensors, and may detect information itself acquired by the sensors as detection results. Further, the target terminal 10 may detect, as a detection result, information obtained by performing additional arithmetic processing on information acquired by a sensor. The target terminal 10 may also detect detection results on the basis of information acquired by a plurality of sensors. Note that the target terminal 10 may detect various detection results in association with detection times.

The target terminal 10 may detect the position information of the protected person by, for example, using a sensor that receives a radio wave transmitted from a GNSS (Global Navigation Satellite System). Note that the target terminal 10 may detect the position information of the protected person by using a sensor that acquires a unique ID in communication using Wi-Fi (registered trademark) or Bluetooth (registered trademark) or a unique ID of a base station with which communication is possible.

The target terminal 10 may use various sensors to detect environment-related information. For example, the target terminal 10 may detect, as the environment-related information, information obtained by a sensor that acquires information indicating weather, temperature, humidity, atmospheric pressure, or illuminance.

The target terminal 10 may use various sensors to detect information related to a behavior of the protected person. Specifically, the target terminal 10 may detect the information related to the behavior of the protected person using a geomagnetic sensor, an acceleration sensor, a gyro sensor, or a sensor that acquires infrared, sound, or an image. Note that the target terminal 10 may recognize, on the basis of information acquired by a sensor that acquires an image, an object appearing in the obtained image.

For example, the target terminal 10 may detect information indicating a means of movement of the protected person as the information related to the behavior of the protected person, on the basis of information obtained by an acceleration sensor, a gyro sensor, and a sensor that acquires atmospheric pressure.

Further, for example, the target terminal 10 may detect information indicating an accompanying person of the protected person as the information related to the behavior of the protected person, on the basis of information obtained by a sensor that acquires sound and the position information of the protected person.

Further, for example, the target terminal 10 may use a geomagnetic sensor, an acceleration sensor, or a gyro sensor to detect information related to a motion or a posture of the protected person. Thus, the target terminal 10 may detect information indicating an action of the protected person, such as sitting or standing, as the information related to the behavior of the protected person, on the basis of the information related to the motion or the posture of the protected person.

Further, for example, the target terminal 10 may detect information indicating whether or not the protected person is having a meal or information indicating whether or not the protected person is doing housework as the information related to the behavior of the protected person, on the basis of the position information of the protected person, a result of recognizing an object appearing in an obtained image, and the information indicating the action of the protected person.

Further, for example, the target terminal 10 may detect information indicating whether or not the protected person is having a drinking session as the information related to the behavior of the protected person, on the basis of the position information of the protected person, information obtained by a sensor that acquires sound, and the information indicating the accompanying person of the protected person.

Further, for example, the target terminal 10 may detect information indicating whether or not the protected person is taking a walk as the information related to the behavior of the protected person, on the basis of a history of the position information of the protected person, the information indicating the accompanying person of the protected person, and the information indicating the means of movement of the protected person.

Here, in a case where an information processing terminal such as a smartphone or a tablet terminal is used as the target terminal 10, the target terminal 10 may detect, as information related to a state of the target terminal 10, information related to a use state of an application, on/off switching operation of a screen, touch operation on the screen, operation of buttons, a charge state, an earphone connection state, or the like as to the target terminal 10.

For example, the target terminal 10 may detect information indicating whether or not the protected person is working as the information related to the behavior of the protected person, on the basis of information related to the use state of the application and the on/off switching operation of the screen and the position information of the protected person.

Next, in step S105, the target terminal 10 transmits detection results to the server apparatus 30. The detection results transmitted from the target terminal 10 are stored in the storage unit 35 of the server apparatus 30.

Next, the process flow illustrated in FIG. 5 ends.

(2-2. Determination Process)

FIG. 6 is a flowchart illustrating an example of a flow of a determination process performed by the server apparatus 30 according to the present embodiment. The process flow illustrated in FIG. 6 is constantly repeated, for example. FIG. 7 is an explanatory diagram illustrating examples of a reference region and a reference condition set in the server apparatus 30 according to the present embodiment.

When the process flow illustrated in FIG. 6 is started, first, in step S311, the determination unit 32 of the server apparatus 30 determines whether or not the position of the protected person is within a reference region. In a case where it is determined that the position of the protected person is within the reference region (step S311/YES), the process proceeds to step S313. On the other hand, in a case where it is determined that the position of the protected person is not within the reference region (step S311/NO), the process proceeds to step S315.

In the server apparatus 30, the reference region is set in association with a reference condition. Specifically, the reference region is a geographic region in which the protected person is expected to be located relatively frequently (i.e., a region that enables determination of whether or not the position of the protected person is in a normal state). Specifically, the reference condition is a condition that defines an event that is expected to occur relatively frequently in a case where the protected person is located in the reference region.

The reference condition includes, for example, a time condition, an environment condition, and a behavior condition. The time condition is a condition that defines time-related information. The environment condition is a condition that defines environment-related information. The behavior condition is a condition that defines information related to a behavior of the protected person. In the server apparatus 30, for example, reference regions and reference conditions illustrated in FIG. 7 are set. In FIG. 7, a reference region is associated with reference conditions in each line. Information indicating the reference regions and the reference conditions set in the server apparatus 30 may be stored in the storage unit 35.

Specifically, in the example illustrated in FIG. 7, the reference region "home" corresponds to a region within a reference radius (e.g., 120 m) from a representative point of the protected person's home. The reference region "school" corresponds to a region within a reference radius from a representative point of the protected person's school. The reference region "friend's house" corresponds to a region within a reference radius from a representative point of a house of the protected person's friend. Thus, a reference region may be, for example, a region within a reference radius from a specific representative point. Note that the reference radius may differ from each other between the reference regions.

In addition, the reference region "home to school" corresponds to a region within a route having a reference width (e.g., 200 m) from the representative point of the protected person's home to the representative point of school. The reference region "home to friend's house route 1" corresponds to a region within a route having a reference width from the representative point of the protected person's home to the representative point of the friend's house. The reference region "home to friend's house route 2" corresponds to a region within a route having a reference width from the representative point of the protected person's home to the representative point of the friend's house, the region being different from the reference region "home to friend's house route 1". Thus, a reference region may be, for example, a region within a route having a reference width between specific representative points. Note that the reference width may differ from each other between the reference regions.

The time condition is, specifically, that time-related information corresponds to the reference region. The time-related information includes, for example, information indicating a day of the week or a time slot. In addition, the environment condition is that environment-related information corresponds to the reference region. The environment-related information includes, for example, information indicating weather, temperature, humidity, atmospheric pressure, or illuminance. Further, the behavior condition is that information related to a behavior of the protected person corresponds to the reference region. The information related to the behavior of the protected person includes, for example, information indicating the means of movement, the accompanying person, or a behavior content of the protected person. The behavior content of the protected person may include a content of a behavior over a relatively long period of time, such as having a meal, having a drinking session, taking a walk, or working, as well as a content of a behavior in a relatively short period of time, such as sitting or standing.

Note that examples of the above-mentioned time-related information, environment-related information, and information related to the behavior of the protected person are merely examples, and the various kinds of information may include other information. In that case, the target terminal 10 may be provided with a sensor for detecting other information, for example, as appropriate.

Specifically, in the example illustrated in FIG. 7, a time condition indicating that the day of the week is a weekday is set as a reference condition corresponding to the reference region "school".

In addition, as a reference condition corresponding to the reference region "home to school", a time condition indicating that the day of the week is a weekday and a behavior condition indicating that the means of movement is by train are set in association with each other.

In addition, a time condition indicating that the day of the week is Saturday or Sunday is set as a reference condition corresponding to the reference region "friend's house".

In addition, as a reference condition corresponding to the reference region "home to friends' house route 1", a time condition indicating that the day of the week is Saturday or Sunday, an environment condition indicating that the weather is fine, and a behavior condition indicating that the means of movement is on foot are set in association with each other.

In addition, as a reference condition corresponding to the reference region "home to friend's house route 2", a time condition indicating that the day of the week is Saturday or Sunday, an environment condition indicating that the weather is rainy, and a behavior condition indicating that the means of movement is by bus are set in association with each other.

For example, there may be a reference region for which no reference condition is set, such as the reference region "home". In addition, for example, a plurality of combinations of reference conditions may be set for the same reference region.

Note that in a case where a plurality of reference regions is set as illustrated in FIG. 7, the determination unit 32 determines whether or not the position of the protected person is within the reference region for each reference region in step S311.

In step S313, the determination unit 32 determines whether or not a reference condition is satisfied.

Specifically, the determination unit 32 determines whether or not the reference condition corresponding to the reference region in which the protected person is determined to be located in step S311 is satisfied.

For example, in the example illustrated in FIG. 7, in a case where it is determined that the position of the protected person is within the reference region "home to school", the determination unit 32 determines whether or not the time condition indicating that the day of the week is a weekday and the behavior condition indicating that the means of movement is by train are satisfied.

The server apparatus 30 may acquire time-related information by measuring time or by receiving the time-related information from an external apparatus. The determination unit 32 may determine whether or not the time condition is satisfied on the basis of the time-related information thus acquired. The determination unit 32 may also determine whether the environment condition and the behavior condition are satisfied on the basis of detection results transmitted from the target terminal 10.

Next, in step S315, the determination unit 32 causes the storage unit 35 to store determination results.

The determination results stored in the storage unit 35 specifically include a determination result as to whether or not the position of the protected person is within the reference region in step S311. The determination results stored in the storage unit 35 also include a determination result as to whether or not the reference condition is satisfied in step S313.

Next, in step S317, the communication unit 31 transmits information related to determination results to the user terminal 20 in accordance with the determination results by the determination unit 32.

For example, in a case where a determination result as to whether or not the position of the protected person is within any reference region is different from a determination result in the previous determination process, the communication unit 31 transmits, to the user terminal 20, information indicating that the position of the protected person has moved from within any reference region to outside the reference region or from outside the reference region to within the reference region. Note that in a case where it is determined that the position of the protected person is outside the reference region, the communication unit 31 may continuously transmit information to that effect to the user terminal 20.

Specifically, in a case where a protected person who was passing through the reference region "home to school" moves to a facility such as a supermarket outside the reference region "home to school", the communication unit 31 transmits, to the user terminal 20, information indicating that the protected person has moved from within the reference region to outside the reference region.

Here, in a case where the time condition or the environment condition is not satisfied, the communication unit 31 may determine that the position of the protected person is outside the reference region regardless of the determination result in step S311.

Specifically, if a protected person who was in the reference region "home" moves into the reference region "home to school" in a case where the day of the week is Saturday, the communication unit 31 may transmit, to the user terminal 20, information indicating that the protected person has moved from within the reference region to outside the reference region. Further, if a protected person who was in the reference region "home" moves into the reference region "home to the friend's house route 1" in a case where the weather is rainy, the communication unit 31 may transmit, to the user terminal 20, information indicating that the protected person has moved from within the reference region to outside the reference region.

Further, for example, in a case where a determination result as to which reference region the protected person is located in is different from a determination result in the previous determination process, the communication unit 31 transmits, to the user terminal 20, information indicating from which reference region into which reference region the protected person has moved.

Specifically, in a case where a protected person who was passing through the reference region "home to school" moves into the reference region "school", the communication unit 31 transmits, to the user terminal 20, information indicating that the protected person has moved from the reference region "home to school" into the reference region "school".

Further, for example, in a case where it is determined that the behavior condition corresponding to the reference region in which the protected person is determined to be located is not satisfied, the communication unit 31 transmits information to that effect to the user terminal 20.

Specifically, in a case where the means of movement of a protected person passing through the reference region "home to school" is by car, the communication unit 31 transmits, to the user terminal 20, information indicating that the behavior condition is not satisfied and the means of movement of the protected person is different from the normal means of movement.

Note that the examples of the reference condition illustrated in FIG. 7 are merely examples. For example, the number of reference conditions associated with a reference region may be larger than that in the example illustrated in FIG. 7, for example. In such a case, a combination of determination results desired for determination result transmission may be set as appropriate. For example, the communication unit 31 may transmit determination results to the user terminal 20 in a case where a specific plurality of conditions out of the reference conditions holds or a case where a specific plurality of conditions does not hold. Alternatively, the communication unit 31 may transmit determination results to the user terminal 20 in a case where determination results for a specific plurality of conditions out of the reference conditions have changed since the previous determination process.

Further, the communication unit 31 may transmit information related to determination results by the determination unit 32 on the basis of a history of input information from the protector with respect to transmitted information related to determination results by the determination unit 32. The input information is information inputted by the protector.

For example, the user terminal 20 may transmit, to the server apparatus 30, positive input information indicating wishing to be notified from now on of information related to determination results of which notification has been given to the protector, or negative input information indicating not wishing to be notified of such information from now on, as will be described later. In this case, the communication unit 31 may transmit information related to determination results by the determination unit 32 on the basis of the history of the positive input information and the negative input information transmitted from the user terminal 20. For example, in some cases, a relatively large amount of positive input information is transmitted when the protector is at home, and a relatively large amount of negative input information is transmitted when the protector is out of home. In such a case, the communication unit 31 may transmit information related to determination results less frequently when the protector is out of home than when the protector is at home.

Next, the process flow illustrated in FIG. 6 ends.

(2-3. Determination Result Notification Process)

FIG. 8 is a flowchart illustrating an example of a flow of a determination result notification process performed by the user terminal 20 according to the present embodiment. The process flow illustrated in FIG. 8 is constantly repeated, for example.

When the process flow illustrated in FIG. 8 is started, first, in step S211, the user terminal 20 determines whether or not information related to determination results has been received. In a case where it is determined that information related to determination results has been received (step S211/YES), the process proceeds to step S213. On the other hand, in a case where it is determined that information related to determination results has not been received (step S211/NO), the process flow illustrated in FIG. 8 ends.

In step S213, the user terminal 20 notifies the protector of the information related to the determination results.

For example, the user terminal 20 notifies the protector of information related to a determination result by displaying an image directly indicating a content of the received determination result. Further, the user terminal 20 may notify the protector of the information related to the determination result by displaying an object corresponding to the received information related to the determination result. Further, the user terminal 20 may notify the protector of the information related to the determination result by outputting a sound corresponding to the received information related to the determination result. As described above, information related to a determination result is not limited to information directly indicating the content of the determination result.

Next, in step S215, the user terminal 20 determines whether or not there has been an input operation by the protector with respect to the information related to the determination results. In a case where it is determined that there has been an input operation by the protector with respect to the information related to the determination results (step S215/YES), the process proceeds to step S217. On the other hand, in a case where it is determined that there has been no input operation by the protector with respect to the information related to the determination results (step S215/NO), the process flow illustrated in FIG. 8 ends.

For example, the user terminal 20 accepts an operation to select wishing or not wishing to be notified from now on of the information related to the determination results of which notification has been given, as an input operation by the protector with respect to the information related to the determination results. In a case where the user terminal 20 accepts an input operation to select wishing to be notified from now on of the information related to the determination results of which notification has been given, the user terminal 20 acquires positive input information as input information from the protector. On the other hand, in a case where the user terminal 20 accepts an input operation to select not wishing to be notified from now on of the information related to the determination results of which notification has been given, the user terminal 20 acquires negative input information as input information from the protector. Note that the user terminal 20 may determine that there has been no such input operation in a case where the protector performs an operation indicating not performing such an input operation.

In step S217, the user terminal 20 transmits, to the server apparatus 30, input information from the protector with respect to the information related to the determination results. The input information from the protector with respect to the information related to the determination results, which has been transmitted from the user terminal 20, is stored in the storage unit 35 of the server apparatus 30.

Next, the process flow illustrated in FIG. 8 ends.

(2-4. Extraction Process)

FIG. 9 is a flowchart illustrating an example of a flow of an extraction process performed by the server apparatus 30 according to the present embodiment. The process flow illustrated in FIG. 9 is repeated, for example, every time a preset set time (e.g., 24 hours) elapses.

When the process flow illustrated in FIG. 9 is started, first, in step S321, the extraction unit 33 of the server apparatus 30 acquires, from the storage unit 35, a history of detection results transmitted from the target terminal 10. For example, the extraction unit 33 acquires, from the storage unit 35, detection results detected within a preset set period (e.g., a period of past three months).

Next, in step S323, the extraction unit 33 extracts a reference region candidate as a candidate for a reference region.

For example, the extraction unit 33 extracts the reference region candidate on the basis of a history of the position of the protected person.

Specifically, in a case where the position of the protected person at each time is plotted on a map on the basis of the acquired history of the position information of the protected person, the extraction unit 33 extracts a region having relatively dense plot points on the map. Then, the extraction unit 33 extracts a representative point of a facility or the like in the vicinity of the middle of the region having relatively dense plot points. Here, a position corresponding to the middle of the region having relatively dense plot points may be extracted as a representative point. Then, the extraction unit 33 extracts a region within a reference radius from the extracted representative point as a reference region candidate. Here, the extraction unit 33 determines the reference radius so that, for example, a ratio of the plot points located in the reference region candidate among the plot points forming the region having relatively dense plot points is equal to or greater than a preset set ratio (e.g., 95%).

In addition, in a case where the plot points indicating the position of the protected person at each time are connected by line segments (hereinafter, referred to as line segments between plot points) in time order, the extraction unit 33 extracts a region having relatively dense line segments between plot points on the map. Then, the extraction unit 33 extracts a route between representative points so that at least most of the route matches the region having relatively dense line segments between plot points. Then, the extraction unit 33 extracts a region within the extracted route having a reference width between the representative points as a reference region candidate. Here the extraction unit 33 determines the reference width so that, for example, a ratio of the line segments between plot points located in the reference region candidate among the plot points forming the region having relatively dense line segments between plot points is equal to or greater than a preset set ratio (e.g., 95%).

In the present embodiment, the reference region candidate is thus extracted on the basis of the position information of the protected person detected by the target terminal 10 using the sensor. This makes it possible to, for example, improve the position precision of a representative point of a facility in the extracted reference region candidate, as compared with the representative point of the facility registered in a mapping application. In addition, the position information of the protected person detected by the target terminal 10 using the sensor is also used in the determination process described above. Therefore, in a case where a reference region is set on the basis of the extracted reference region candidate, it is possible to improve precision in the determination process as compared with a case where the reference region is set regardless of the extracted reference region candidate, by suppressing a decrease in the precision in the determination process due to a measuring error by the sensor.

Next, in step S325, the extraction unit 33 extracts a reference condition corresponding to the extracted reference region candidate.

For example, the extraction unit 33 extracts the reference condition corresponding to the reference region candidate on the basis of the history of the position of the protected person. It is possible to extract the reference condition by using, in addition to the history of the position information of the protected person, a history of other information different from the position information of the protected person as appropriate.

Specifically, the extraction unit 33 may extract a time condition corresponding to the reference region candidate on the basis of the history of the position information of the protected person and a history of the time-related information. For example, the extraction unit 33 extracts, as the day of the week corresponding to the reference region candidate, a day of the week that is relatively frequent as the day of the week in a case where the protected person is located in the reference region candidate.

The extraction unit 33 may also extract an environment condition corresponding to the reference region candidate on the basis of the history of the position information of the protected person and a history of the environment-related information. For example, the extraction unit 33 extracts, as the weather corresponding to the reference region candidate, a weather that is relatively frequent as the weather in a case where the protected person is located in the reference region candidate.

The extraction unit 33 may also extract a behavior condition corresponding to the reference region candidate on the basis of the history of the position information of the protected person and a history of the information related to the behavior of the protected person. For example, the extraction unit 33 extracts, as the means of movement corresponding to the reference region candidate, a means of movement that is relatively frequent as the means of movement of the protected person in a case where the protected person is located in the reference region candidate.

Next, in step S327, the extraction unit 33 causes the storage unit 35 to store extraction results.

Specifically, the storage unit 35 stores the extracted reference region candidate in association with the reference condition.

Next, the process flow illustrated in FIG. 9 ends.

(2-5. Extraction Result Transmission Process)

FIG. 10 is a flowchart illustrating an example of a flow of an extraction result transmission process performed by the server apparatus 30 according to the present embodiment. The process flow illustrated in FIG. 10 is constantly repeated, for example.

When the process flow illustrated in FIG. 10 is started, first, in step S331, the communication unit 31 of the server apparatus 30 determines whether or not a trigger condition is satisfied. In a case where it is determined that the trigger condition is satisfied (step S331/YES), the process proceeds to step S333. On the other hand, in a case where it is determined that the trigger condition is not satisfied (step S331/NO), the process flow illustrated in FIG. 10 ends.

The trigger condition is a condition for permitting transmission of information related to extraction results to the user terminal 20. For example, the trigger condition may be that the extraction process exemplified in FIG. 9 has been executed. The trigger condition may also be that the user terminal 20 has started displaying a setting screen in response to an operation by the protector. The trigger condition may also be that the protector has performed an operation of determining the reference region and reference condition to be set while the user terminal 20 is displaying the setting screen.

In step S333, the communication unit 31 transmits information related to extraction results extracted by the extraction unit 33 to the user terminal 20.

Specifically, the communication unit 31 acquires the information related to the extraction results stored in the storage unit 35, and transmits the acquired information to the user terminal 20. As described above, the storage unit 35 stores the extracted reference region candidate in association with the reference condition. Therefore, the communication unit 31 outputs information related to the extracted reference region candidate in association with the reference condition.

Next, the process flow illustrated in FIG. 10 ends.

(2-6. Extraction Result Notification Process)

FIG. 11 is a flowchart illustrating an example of a flow of an extraction result notification process performed by the user terminal 20 according to the present embodiment. The process flow illustrated in FIG. 11 is constantly repeated, for example.

When the process flow illustrated in FIG. 11 is started, first, in step S221, the user terminal 20 determines whether or not information related to extraction results has been received. In a case where it is determined that information related to extraction results has been received (step S221/YES), the process proceeds to step S223. On the other hand, in a case where it is determined that information related to extraction results has not been received (step S221/NO), the process flow illustrated in FIG. 11 ends.

In step S223, the user terminal 20 notifies the protector of the information related to the extraction results.

For example, the user terminal 20 notifies the protector of information related to an extraction result by displaying an image directly indicating a content of the received extraction result. Further, the user terminal 20 may notify the protector of the information related to the extraction result by displaying an object corresponding to the information related to the received extraction result. Further, the user terminal 20 may notify the protector of the information related to the extraction result by outputting a sound corresponding to the received information related to the extraction result. As described above, information related to an extraction result is not limited to information directly indicating the content of the extraction result.

Next, in step S225, the user terminal 20 determines whether or not an input operation by the protector with respect to the information related to the extraction results has been completed. In a case where it is determined that the input operation by the protector with respect to the information related to the extraction results has been completed (step S225/YES), the process proceeds to step S227. On the other hand, in a case where it is determined that the input operation by the protector with respect to the information related to the extraction results has not been completed (step S225/NO), the process of the step S225 is repeated.

For example, the user terminal 20 accepts an operation of determining the reference region and reference condition to be set as the input operation by the protector with respect to the information related to the extraction results. As described above, in step S223, notification of the information related to the extraction results is given. Therefore, an operation of determining the reference region and reference condition to be set is performed while notification of the information related to the reference region candidate is being given in association with the reference condition, or after the notification has been given. This enables the protector to perform the operation of determining the reference region and the reference condition by referring to the information related to the reference region candidate of which notification is given. Thus, the protector may determine the reference region and reference condition to be set on the basis of the extracted reference region candidate. For example, the protector determines a reference region candidate and a reference condition corresponding to the reference region candidate as the reference region and reference condition to be set. The user terminal 20 may determine that the input operation by the protector with respect to the information related to the extraction results has been completed by completion of the operation of determining the reference region and reference condition to be set.

In step S227, the user terminal 20 transmits, to the server apparatus 30, information inputted by the protector with respect to the information related to the extraction results. The information inputted by the protector with respect to the information related to the extraction results is, specifically, information indicating a region and a condition determined by the protector as the reference region and reference condition to be set.

Next, the process flow illustrated in FIG. 11 ends.

(2-7. Setting Process)

FIG. 12 is a flowchart illustrating an example of a flow of a setting process performed by the server apparatus 30 according to the present embodiment. The process flow illustrated in FIG. 12 is constantly repeated, for example.

When the process flow illustrated in FIG. 12 is started, first, in step S341, the setting unit 34 of the server apparatus 30 determines whether or not input information with respect to information related to extraction results has been received. In a case where it is determined that input information with respect to information related to extraction results has been received (step S341/YES), the process proceeds to step S343. On the other hand, in a case where it is determined that input information with respect to information related to extraction results has not been received (step S341/NO), the process flow illustrated in FIG. 12 ends.

In step S343, the setting unit 34 sets a reference region and a reference condition.

Specifically, the setting unit 34 sets the reference region and the reference condition on the basis of the received input information with respect to the information related to the extraction results. More specifically, the setting unit 34 sets a region and a condition determined by the protector as the reference region and the reference condition. As described above, the reference region and reference condition to be set may be determined by the protector on the basis of the extracted reference region candidate. Therefore, the setting unit 34 may set the reference region and the reference condition on the basis of the extracted reference region candidate.

Note that the setting unit 34 may set the reference region and the reference condition regardless of the operation by the protector to determine the reference region and reference condition to be set. For example, in a case where the extraction process exemplified in FIG. 9 is executed, the setting unit 34 may set the reference region candidate extracted by the extraction process as the reference region, regardless of the operation by the protector. In this case, in the server apparatus 30, the reference condition extracted by the extraction process is set in association with the reference region candidate.

In addition, the setting unit 34 may set the reference region and the reference condition on the basis of a history of input information from the protector with respect to outputted information related to determination results by the determination unit 32.

For example, the setting unit 34 may set the reference region and the reference condition on the basis of a history of positive input information and negative input information transmitted from the user terminal 20. For example, in a case where a relatively large amount of positive input information is transmitted, the setting unit 34 may change the settings of the reference region and the reference condition so that information related to determination results is transmitted more frequently than in a case where a relatively large amount of negative input information is transmitted.

Next, the process flow illustrated in FIG. 12 ends.

(2-8. Display Examples of Various Screens)

Next, description will be given on display examples of various screens displayed by the user terminal 20 or the like of the watch-over system 1 described above.

(2-8-1. Display Examples of Setting Screen)

First, referring to FIGS. 13 to 15, display examples of a setting screen displayed by the user terminal 20 will be described. FIG. 13 is an explanatory diagram illustrating a first example of a setting screen displayed by the user terminal 20 according to the present embodiment. FIG. 14 is an explanatory diagram illustrating a second example of a setting screen displayed by the user terminal 20 according to the present embodiment. FIG. 15 is an explanatory diagram illustrating a third example of a setting screen displayed by the user terminal 20 according to the present embodiment.

Note that each of the setting screens illustrated in FIGS. 13 to 15 is, specifically, a screen for adjusting a notification setting that defines in what case the user terminal 20 notifies the protector of information related to determination results by the determination unit 32. It is possible for the protector to adjust timing of notification by the user terminal 20 of information related to determination results by the determination unit 32 by, for example, adding, deleting, or changing the reference region or the reference condition set on the server apparatus 30 side by adjusting the notification setting as appropriate on the user terminal 20 side.

As described above, for example, the user terminal 20 starting to display a setting screen in response to an operation by the protector triggers transmission of information related to extraction results extracted by the extraction unit 33 to the user terminal 20, and the user terminal 20 notifies the protector of the information. In that case, for example, notification of the information related to the extraction results may be given on the setting screen displayed by the user terminal 20. A setting screen D31 illustrated in FIG. 13 and a setting screen D32 illustrated in FIG. 14 are examples of a setting screen in such a case.

Note that hereinafter described is an example in which notification of information indicating a reference region candidate is given on each setting screen, but notification of information indicating a reference condition corresponding to the reference region candidate may be given on each setting screen. In that case, for example, widgets used in the operation of determining the reference condition may be displayed as appropriate on each setting screen.

As illustrated in FIG. 13, the setting screen D31 shows a display region 132 in which an extracted reference region candidate 701 and an icon 602 indicating a position of a representative point of the reference region candidate 701 are displayed superimposed on a map. The extracted reference region candidate 701 corresponds to a region within a reference radius of 120 m from the representative point. Also shown below the display region 132 is a display region 133 for accepting an input operation from the protector.

The protector is able to adjust the reference radius of the reference region candidate 701 using a slider 501 displayed in the display region 133. The protector is also able to complete an operation of determining a reference region using a button 502 displayed in the display region 133. For example, the protector may determine the extracted reference region candidate 701 itself as the reference region to be set. In addition, the protector may determine a region obtained by adjusting the reference radius of the extracted reference region candidate 701, as the reference region to be set. Further, the protector may complete the operation of determining the reference region to be set without adopting the extracted reference region candidate 701 as the reference region to be set. Also shown above the display region 132 is a display region 131 in which various buttons and messages are displayed.

As illustrated in FIG. 14, the setting screen D32 shows a display region 135 in which extracted reference region candidates 702, 703, 704, 705, and 706 and icons 603 and 604 indicating positions of representative points of the reference region candidates 702 and 703 are displayed superimposed on a map. For example, the icons 603 and 604 indicate the positions of the representative points of the protected person's home and school, respectively. The reference region candidates 702, 703, and 704 each correspond to a region within a reference radius from a representative point. The reference region candidate 705 corresponds to a region within a route having a reference width from the representative point of the reference region candidate 702 to the representative point of the reference region candidate 703. The reference region candidate 706 corresponds to a region within a route having a reference width from the representative point of the reference region candidate 702 to the representative point of the reference region candidate 704. Also shown below the display region 135 is a display region 136 in which a content of the operation of determining the reference region is displayed.

It is possible for the protector to perform the operation of determining the reference region using a button 503 displayed on the right edge side of the boundary between the display region 135 and the display region 136. For example, it is possible to designate a route on the map by performing a dragging operation, which is an operation of tracing on the map displayed in the display region 135 with a finger or the like, and determine a region corresponding to the designated route as a reference region to be set by selecting the button 503 by a tapping operation or the like. The protector may determine the reference region candidates 705 and 706 as reference regions to be set by performing a dragging operation so as to trace the extracted reference region candidates 705 and 706. Further, the protector may complete the operation of determining the reference region to be set without adopting the extracted reference region candidates 705 and 706 as the reference regions to be set. Also shown above the display region 135 is a display region 134 in which various buttons and messages are displayed.

Further, as described above, for example, while the user terminal 20 is displaying the setting screen, the protector performing the operation of determining the reference region and reference condition to be set may trigger transmission of information related to extraction results extracted by the extraction unit 33 to the user terminal 20, and the user terminal 20 may notify the protector of the information. In that case, for example, notification of the information related to the extraction results is given on the setting screen displayed by the user terminal 20. A setting screen D33 illustrated in FIG. 15 is an example of a setting screen in such a case.

As illustrated in FIG. 15, the display region 135 of the setting screen D33 shows a route 801 designated by the protector performing a dragging operation in the display region 135. Here, the route 801 starts from the representative point of the reference region candidate 702 and matches a portion of the reference region candidate 705. Thus, for example, in a case where a portion of the reference region candidate 705 is designated by the input operation by the protector, a portion of the reference region candidate 705 excluding the route 801 is displayed so as to be complemented in the display region 135.

The protector is able to determine the reference region candidate 705 as a reference region to be set by performing a dragging operation so as to trace the displayed portion of the reference region candidate 705 excluding the route 801.

Thus, when the protector performs the operation of determining the reference region and the reference condition, the protector may be notified of information related to extraction results extracted by the extraction unit 33, in a complementary manner. For example, in a case where a region within a reference radius from a representative point is extracted as a reference region candidate, when the protector inputs information excluding the reference radius in the operation of determining the reference region and the reference condition, the protector may be notified of information indicating the reference radius in a complementary manner.

(2-8-2. Display Examples of Screens Related to Determination Result Notification)

Next, referring to FIGS. 16 to 18, display examples of screens related to determination result notification displayed by the user terminal 20 will be described. FIG. 16 is an explanatory diagram illustrating an example of a home screen displayed by the user terminal 20 according to the present embodiment at the time of determination result notification. FIG. 17 is an explanatory diagram illustrating an example of a map screen displayed by the user terminal 20 according to the present embodiment at the time of determination result notification. FIG. 18 is an explanatory diagram illustrating an example of a suggested change to a determination result notification setting displayed by the user terminal 20 according to the present embodiment.

As described above, for example, in a case where the position of the protected person has moved out of (left) the reference region from within any reference region, the determination unit 32 determines that the protected person has so moved, and information related to the determination result is transmitted to the user terminal 20. Then, the user terminal 20 notifies the protector of the determination result. In that case, for example, notification of the determination result may be given on a top screen displayed by the user terminal 20. A home screen D41 illustrated in FIG. 16 is an example of a home screen in such a case.

As illustrated in FIG. 16, for example, the current date, day of the week, and time are displayed on the home screen D41. These pieces of information are displayed on the home screen, for example, regardless of whether or not notification of determination results determined by the determination unit 32 is given. Here, the home screen D41 displayed at the time of notification of determination results determined by the determination unit 32 further shows a display region 201 in which a content of a determination result is displayed by text or the like.

The display region 201 is located, for example, on the middle side of the home screen D41. In the display region 201 is displayed an icon 303 for inputting information indicating a relatively high interest in the information related to the determination result shown by the display region 201. By selecting the icon 303 by a tapping operation or the like, the protector is able to input information indicating that the protector is relatively interested in the information related to the determination result shown by the display region 201. The information inputted using the icon 303 in this manner is used in event extraction, which will be described later.

Note that the icon 303 is turned on by being selected by, for example, a tapping operation or the like.

Here, for example, in a case where the display region 201 of the home screen D41 is selected by a tapping operation or the like, the screen displayed by the user terminal 20 transitions to a map screen displaying determination results. A map screen D22 illustrated in FIG. 17 is an example of a map screen in such a case.

As illustrated in FIG. 17, in the display region 122 of the map screen D22, set reference regions 901, 902, and 903, icons 605 and 606 indicating positions of representative points of the reference regions 901 and 902, and a moving route 802 of the protected person are displayed superimposed on a map. For example, the icons 605 and 606 indicate the positions of the representative points of the protected person's home and school, respectively. The reference regions 901 and 902 each correspond to a region within a reference radius from the representative point. The reference region 903 corresponds to a region within a route having a reference width from the representative point of the reference region 901 to the representative point of the reference region 902.

The display region 122 of the map screen D22 further shows a display region 202 in which a content of a determination result is displayed by text or the like. For example, in a case where the protected person leaves the reference region 903 corresponding to the region within the route from home to school, in the display region 122, the display region 202 indicating that the protected person has left the reference region 903 is displayed in the vicinity of the current position of the protected person, along with the moving route 802 of the protected person, as illustrated in FIG. 17. Further, as in the display region 201 of the home screen D41 illustrated in FIG. 16, in the display region 202 is displayed the icon 303 for inputting information indicating a relatively high interest in the information related to the determination result shown by the display region 202. Note that, like the icon 303 in the display region 201 illustrated in FIG. 16, the icon 303 in the display region 202 is turned on by being selected by, for example, a tapping operation or the like.

In addition, at the bottom of the map screen D22 are displayed a button 504 for contacting the protected person and a button 505 for inputting information indicating not wishing to be notified from now on of the information related to the determination result shown by the display region 202. The protector is able to talk to the protected person via the user terminal 20 and the target terminal 10, for example, by selecting the button 504 by a tapping operation or the like. Note that a function that is achievable by using the button 504 may be selected as appropriate in accordance with the content of the determination result notification. For example, in a case where the button 504 is selected by a tapping operation or the like, an image captured by the target terminal 10 carried by the protected person may be transmitted from the target terminal 10 to the user terminal 20. The protector is also able to input negative information indicating that the protector does not wish to be notified from now on of the information related to the determination result shown by the display region 202, by selecting the button 505 by a tapping operation or the like.

Here, for example, in a case where the button 505 of the map screen D22 is selected by a tapping operation or the like, the extraction unit 33 extracts a reference condition corresponding to the reference region 903 related to the determination result of which notification has been given, and information related to the extraction result is transmitted to the user terminal 20. Then, the user terminal 20 displays a suggested change to the notification setting in the user terminal 20 on the basis of the extraction result. In that case, for example, the suggested change to the notification setting in the user terminal 20 is displayed on the map screen D22. The map screen D22 illustrated in FIG. 18 illustrates an example of a suggested change to a notification setting in such a case. Note that, as described above, the notification setting is a setting that defines in what case the user terminal 20 notifies the protector of information related to determination results by the determination unit 32.

As illustrated in FIG. 18, when a suggested change to the notification setting is displayed on the basis of the reference condition extraction result, the map screen D22 shows a display region 203 in which a content of the current notification setting is displayed by text or the like, and a display region 204 in which a content of a newly presented notification setting is displayed by text or the like.

In the display region 203 are displayed icons 305, 306, and 351 indicating the content of the current notification setting shown by the display region 203. For example, the icon 305 is an icon indicating a route from home to school. Further, the icon 306 is an icon indicating leaving the reference region. Further, the icon 351 is an icon indicating a protected person carrying the target terminal 10. Specifically, the display region 203 indicates that, as the current notification setting, in a case where the protected person carrying the target terminal 10 leaves the route from home to school, the user terminal 20 notifies the protector of a determination result to that effect.

In addition to the icons displayed in the display region 203, an icon 307 is further displayed in the display region 204. For example, the icon 307 is an icon indicating a weekday. Specifically, the display region 204 indicates that, as a newly presented notification setting, if the protected person leaves the route from home to school only in a case where the day of the week is a weekday, the user terminal 20 notifies the protector of a determination result to that effect.

For example, in a case where the button 505 of the map screen D22 is selected by a tapping operation or the like, the extraction unit 33 may extract a reference condition corresponding to the reference region 903 related to the determination result of which notification has been given, on the basis of the history of the position information of the protected person, or the like as in step S325 in FIG. 9 described above. Further, the extraction unit 33 may extract the reference condition corresponding to the reference region 903 related to the determination result of which notification has been given, on the basis of input information from the protector with respect to the information related to the determination result. For example, in some cases, a relatively large amount of positive input information is transmitted on weekdays, and a relatively large amount of negative input information is transmitted on Saturdays or Sundays. In such a case, the extraction unit 33 extracts a time condition indicating that the day of the week is a weekday as a reference condition corresponding to the reference region 903 related to the determination result of which notification has been given. Thus, as illustrated in FIG. 18, the notification setting is presented by the display region 204 in which the icon 307 is added to the display region 203.

In addition, at the bottom of the map screen D22 are displayed a button 506 for inputting information indicating that the newly presented notification setting is to be adopted and a button 507 for inputting information indicating that the newly presented notification setting is not to be adopted. It is possible for the protector to select to update or maintain the notification setting, respectively, by selecting the button 506 or 507 by a tapping operation or the like.

Note that in a case where the icon 305 indicating the reference region 903 in the display region 204 of the map screen D22 illustrated in FIG. 18 is selected by a tapping operation or the like, the screen displayed by the user terminal 20 transitions to a setting screen in which, for example, a designated route is displayed superimposed on a map as in the setting screen D33 exemplified in FIG. 15. On such a setting screen, the protector is able to change the reference region adopted in the notification setting from the currently set reference region 903 as appropriate, by performing a dragging operation so as to trace the route on the map, for example.

(2-8-3. Display Example of History Screen)

Next, referring to FIGS. 19 and 20, a display example of a history screen displayed by the user terminal 20 or the like will be described. FIG. 19 is an explanatory diagram illustrating an example of a menu displayed by the user terminal 20 or the like according to the present embodiment. FIG. 20 is an explanatory diagram illustrating an example of a history screen displayed by the user terminal 20 or the like according to the present embodiment.

Note that the history screen described below may be displayed not only by the user terminal 20 used by the protector but also by the target terminal 10 carried by the protected person. For example, similar history screens may be displayed by the terminals used by the respective members of the family group. In addition, information in the history screen may be at least partially different between the members.

As described above, the server apparatus 30 stores a variety of information including information detected by the target terminal 10 and the user terminal 20, and the like. Here, by communicating with the server apparatus 30, the user terminal 20 or the like is able to display history information summarizing histories of the variety of information stored in the server apparatus 30. For example, a history screen showing such history information may be displayed by using a menu that is displayed in response to an input operation by each family member. A menu region 205 in a screen illustrated in FIG. 19 is an example of a display region showing a menu in such a case.

Although FIG. 19 illustrates an example in which the menu region 205 is displayed on the status screen D11 illustrated in FIG. 2, the menu region 205 may be displayed on other screens. For example, in a case where a swipe operation is performed, the user terminal 20 or the like displays the menu region 205 showing a menu including icons for displaying various screens. In the menu region 205, for example, icons 308 to 313 are displayed as a menu. In a case where any of the icons 308 to 313 is selected by a tapping operation or the like, the screen displayed by the user terminal 20 or the like transitions to a screen corresponding to the selected icon.

For example, the icon 308 is an icon for displaying a screen (e.g., the above-described status screen D11, map screen D21, or the like) showing the position information of family members. The icon 309 is an icon for displaying a screen (e.g., a notification setting list screen D61 to be described later, or the like) showing information related to notification settings. The icon 310 is an icon for displaying a screen that shows information related to a reference region corresponding to a region within a reference radius from a representative point, out of reference regions set in the server apparatus 30. The icon 311 is an icon for displaying a screen that shows information related to a reference region corresponding to a region within a route having a reference width between representative points, out of the reference regions set in the server apparatus 30. The icon 312 is an icon for displaying a history screen (e.g., a history screen D51 illustrated in FIG. 20) that shows history information summarizing histories of a variety of information related to the family members stored in the server apparatus 30. The icon 313 is an icon for displaying a screen showing information related to various settings including the notification setting in the user terminal 20.

Here, for example, in a case where the icon 312 is selected by a tapping operation or the like, the screen displayed by the user terminal 20 or the like transitions to a history screen showing history information related to the family members. The history screen D51 illustrated in FIG. 20 is an example of a history screen in such a case.

As illustrated in FIG. 20, the history screen D51 shows, for example, a display region 206 in which today's history information related to the family members is displayed. The display region 206 shows a display region 151 in which an image captured today by a family member is displayed, and a display region 152 in which today's history information related to the family members is displayed by text or the like. For example, the display region 152 is disposed below the display region 151. Note that in the history screen D51 may be disposed a display region in which history information of other dates, prior to today, related to the family members is displayed. For example, each family member is able to view the display region in which history information of other dates, prior to today, related to the family members is displayed, by performing a swipe operation.

The image displayed in the display region 151 is, for example, an image selected from images transmitted to the server apparatus 30 from terminals used by the family members. For example, as an image displayed in the display region 151, an image captured at a geographic position (e.g., outside a reference region) where the family member is less likely to be located at normal times may be preferentially used. In addition, for example, even an image captured at a geographic position (e.g., within a reference region) where the family member is often located at normal times may be preferentially used as an image displayed in the display region 151 if the image is captured in a case where a reference condition corresponding to the reference region is not satisfied. In addition, for example, an image in which a smiling face of a person appears may be preferentially used as an image displayed in the display region 151. Whether or not a smiling face appears in the image may be determined by the server apparatus 30, for example, by using image processing. Note that in the display region 151 may be displayed a name of the member who has captured the image displayed in the display region 151.

For example, the display region 152 shows the number of steps taken with other members of the family today (2368 in the example of FIG. 20) and its difference from the same day of the week as today one week ago (an increase of 1246 in the example of FIG. 20). Also shown in the display region 152 is time spent with other members of the family today (10.5 hours in the example of FIG. 20) and its difference from the same day of the week as today one week ago (a decrease of 13 hours in the example of FIG. 20).

Note that the number of steps taken with or the time spent with other members of the family may differ from each other among the members of the same family. Thus, time displayed as the time spent with the other members of the family may be different between a history screen of the terminal of the member who has spent three hours with the other members of the family and a history screen of the terminal of the member who has spent two hours with the other members of the family.

In addition, the display region 152 shows the number of determination result notifications by the determination unit 32 given today (four in the case of FIG. 20). Here, for example, when a portion of the display region 152 where the number of determination result notifications is displayed is selected by a tapping operation or the like, a display region 153 is displayed below the portion where the number of determination result notifications is displayed, as illustrated in FIG. 20. In the display region 153, each content of notifications of determination results by the determination unit 32 given today is shown by text or the like. In addition, the icon 303 for inputting information indicating a relatively high interest in information related to the determination result is displayed for each notification. Note that, like the icon 303 in the display region 201 illustrated in FIG. 16, the icon 303 in the display region 153 is turned on by being selected by, for example, a tapping operation or the like.

Also displayed in the display region 152 is an icon 315 for inputting information indicating a relatively high interest in information related to the display region 206 in which the history information is displayed. By selecting the icon 315 in today's display region 206 by a tapping operation or the like, each family member is able to input information indicating a relatively high interest in information related to today's display region 206. The information thus inputted using the icon 315 is used when searching for the display region 206 of the day liked by the family members. The information inputted using the icon 315 may also be used in event extraction, which will be described later. Note that the icon 315 is turned on by being selected by, for example, a tapping operation or the like.

Also displayed in the display region 152 is an icon 316 for sharing the information related to the display region 206 in which the history information is displayed with other users on a network service (e.g., a social network service). By selecting the icon 316 in today's display region 206 by a tapping operation or the like, each family member is able to share information related to today's display region 206 with other users on a network service.

In addition, for example, an icon 314 indicating that an event described later has been extracted by the extraction unit 33 is displayed at the top of the display region 206 in which today's history information related to the family members is displayed. By selecting the icon 314 by a tapping operation or the like, each family member is able to cause the history screen D51 to transition to a screen related to an event to be described later, for example.

(2-8-4. Display Examples of Screens Related to Events)

Next, with reference to FIGS. 21 to 24, display examples of screens related to events displayed by the user terminal 20 or the like will be described. FIG. 21 is an explanatory diagram illustrating an example of a map screen displayed at the time of event presentation by the user terminal 20 or the like according to the present embodiment. FIG. 22 is an explanatory diagram illustrating an example of an event notification setting displayed by the user terminal 20 or the like according to the present embodiment. FIG. 23 is an explanatory diagram illustrating an example of a notification setting list screen displayed by the user terminal 20 or the like according to the present embodiment. FIG. 24 is an explanatory diagram illustrating an example of a setting screen for an event notification setting displayed by the user terminal 20 or the like according to the present embodiment.

Note that the screens related to events described below may be displayed not only by the user terminal 20 used by the protector but also by the target terminal 10 carried by the protected person. For example, similar screens may be displayed as screens related to events by the terminals used by the respective members of the family group. Further, information in the screen related to an event may be at least partially different between the members.

As described above, in the watch-over system 1, it is determined (monitored) whether or not a state of the protected person is a normal state by applying, as the reference region, a region where the protected person is expected to be located relatively frequently, and applying, as the reference condition, a condition defining an event that is expected to occur relatively frequently in a case where the protected person is located in the reference region, and the protector is notified of determination results. Thus, for example, in a case where the state of the protected person changes from the normal state to a state different from the normal state (e.g., in a case where the protected person leaves a normal school route), it is possible to notify the protector to that effect.

Here, in the watch-over system 1, in a case of a state in which members have a relatively high interest, among states in which family members are in a state different from the normal state (i.e., in a case where an event described later occurs), it is possible to notify each member to that effect. Hereinafter, among the states of family members different from a normal state, the state in which members have a relatively high interest is referred to as an event. For example, in a case where specific three members out of the family members travel between home and a commercial facility at a neighboring station relatively frequently for shopping, it is assumed that, on one occasion, the above three members depart from the route between home and the commercial facility at the neighboring station to visit a furniture store and a park for the first time. It is further assumed that the family members have a relatively high interest in the above three members visiting the furniture store or the park. In this case, the visit of the above three members to the furniture store or the park may correspond to an event.

For example, the server apparatus 30 extracts such an event on the basis of results of input operations by the family members using the icons 303 and 315 of the home screen D41 exemplified in FIG. 16, the map screen D22 exemplified in FIG. 17, or the history screen D51 exemplified in FIG. 20. Note that the server apparatus 30 may extract an event by using a technique such as machine-learning, which learns the preference of each member by using the results of the input operations by the family members using these icons. Then, the server apparatus 30 determines whether or not a position of a family member is within a reference region and whether or not a reference condition is satisfied, by applying a region in which the event occurs as the reference region, and applying, as the reference condition, a condition further desired for the occurrence of the event in a case where the family member is located within the reference region in which the event occurs. This makes it possible to determine whether or not an event has occurred, so that in a case where an event has occurred, it is possible to notify each member to that effect.

For example, even if it feels troublesome to receive a notification when one member next time visits the park that has been visited by the above three members for the first time, a chance to make a video call to an acquaintance may be desired when the three members visit the park next time.

In such a case, giving notification when the above three members visit the park next time makes it possible to give a chance for a family member to make a video call to an acquaintance.

In a case of extracting an event, the server apparatus 30 extracts a reference region candidate, which is a candidate for a reference region in determining whether or not an event has occurred. In addition, the server apparatus 30 may extract a reference condition corresponding to the reference region candidate, and may output information related to the reference region candidate in association with the reference condition. For example, the server apparatus 30 transmits information indicating a notification setting of the extracted event to the user terminal 20 or the like and causes the information to be displayed, as will be described later.

Here, in a case where the server apparatus 30 extracts an event, the server apparatus 30 transmits information indicating that the event has been extracted to the user terminal 20 or the like. In that case, for example, the icon 314 is displayed in the display region 206 of the history screen D51 exemplified in FIG. 20. Then, for example, in a case where the icon 314 is selected by a tapping operation or the like, the screen displayed by the user terminal 20 transitions to a map screen, and information related to the extracted event is displayed on the map screen. A map screen D24 illustrated in FIG. 21 is an example of a map screen in such a case. Specifically, as described above, the map screen D24 illustrated in FIG. 21 is an example of a screen on which, in a case where the visit of specific three members to a furniture store or a park is extracted as an event, information related to the event is displayed.

As illustrated in FIG. 21, in the display region 122 of the map screen D24, icons 605 and 606 indicating positions of representative points, icons 318 and 319 indicating occurrence positions of events, and a moving route 803 of family members corresponding to the events are displayed superimposed on a map. For example, the moving route 803 is a moving route of the above three members, and is a route passing through home whose position is indicated by the icon 605, the furniture store indicated by the icon 319, and the park indicated by the icon 318.

For example, images captured by family members at the furniture store and the park where the events have occurred are displayed in the display region 123 below the display region 122 of the map screen D24.

Here, for example, when the icon 318 or the icon 319 of the map screen D24 is selected by a tapping operation or the like, the user terminal 20 or the like displays a content of a notification setting of the event corresponding to the selected icon. In that case, for example, the content of the event notification setting in the user terminal 20 or the like is displayed on the map screen D24. The map screen D24 illustrated in FIG. 22 illustrates a display example of the event notification setting in the user terminal 20 or the like in such a case. Specifically, the map screen D24 illustrated in FIG. 22 is an example of a screen on which, in a case where the icon 318 that corresponds to an event corresponding to the visit of the specific three members to the park is selected, the notification setting of the event is displayed. Note that the event notification setting is a setting that defines in what case the user terminal 20 or the like notifies a family member of information related to determination results as to the occurrence of an event by the server apparatus 30.

As illustrated in FIG. 22, the map screen D24 on which the content of the event notification setting is displayed shows a display region 207 in which the content of the notification setting of the event corresponding to the selected icon 318 is displayed by text or the like.

In the display region 207 are displayed icons 320, 321, and 352 indicating contents of the notification setting of the event shown by the display region 207. For example, the icon 320 is an icon indicating a park. Further, the icon 321 is an icon indicating entry to a reference region. Further, the icons 352 are icons indicating specific three members of the family corresponding to the event. Specifically, as the notification setting of the extracted event, the display region 207 indicates that in a case where the three members indicated by the icons 352 enter the park indicated by the icon 320, the user terminal 20 or the like notifies a family member of a determination result to that effect.

In the above example, the park indicated by the icon 320 (i.e., the park indicated by the icon 318 in FIG. 21) corresponds to a reference region candidate in determining whether or not an event has occurred. In this case, specifically, a region within a reference radius from a representative point of the park indicated by the icon 320 corresponds to the reference region candidate in determining whether or not an event has occurred. As a reference region in determining whether or not an event has occurred, for example, it is possible to use a region corresponding to a specific representative point, a region corresponding to a route between specific representative points, a region corresponding to a representative point of a facility of a specific category (e.g., an art museum, a scientific museum, or the like), a region corresponding to a route between representative points of facilities of specific categories, or the like.

Note that, as described above, in the determination of whether or not an event has occurred, in addition to determining whether or not the position of a family member is within the reference region, it may be determined whether or not a condition further desired for the occurrence of the event is satisfied as a reference condition. As such a reference condition in determining whether or not an event has occurred, for example, it is possible to use various conditions including the above-mentioned time condition, environment condition, or behavior condition.

For example, as the behavior condition, it is possible to use a condition that defines who accompanies a member corresponding to the event, what relationship the accompanying person has with the member, how many people are involved in the behavior, how many times the member visited the reference region in the past (or during this month, during this week, or today), how long the member has stayed in the reference region, what means of movement is used, how many images have been captured within a predetermined time, or what subject appears in the captured images.

In addition, at the bottom of the map screen D24 are displayed a button 508 for inputting information indicating that the presented event notification setting is to be adopted and a button 509 for inputting information indicating that the presented event notification setting is not to be adopted. It is possible for a family member to select to update or maintain the event notification setting, respectively, by selecting the button 508 or 509 by a tapping operation or the like.

Here, for example, in a case where the button 508 of the map screen D24 illustrated in FIG. 22 is selected by a tapping operation or the like, the screen displayed by the user terminal 20 or the like transitions to a list screen showing a list of notification settings in the user terminal 20 or the like for determination results by the server apparatus 30. A list screen D61 illustrated in FIG. 23 is an example of a notification setting list screen in such a case.

As illustrated in FIG. 23, the notification setting list screen D61 shows display regions 208a, 208b, 208c, and 208d in which contents of the notification settings for the determination results are displayed. Note that, in the following, in a case of not particularly distinguishing between the display regions 208a, 208b, 208c, and 208d, they are simply referred to as display regions 208. Also shown at the top of the list screen D61 is a display region 161 in which various buttons and messages are displayed.

In the display region 208 are displayed icons indicating the contents of the notification setting for each determination result. For example, like the display region 204 illustrated in FIG. 18, the display region 208a indicates that if the protected person indicated by the icon 351 leaves the route from home to school only in a case where the day of the week is a weekday, notification of a determination result to that effect is given. In addition, like the display region 207 illustrated in FIG. 22, the display region 208b indicates that in a case where three members indicated by the icons 352 enter the park, notification of a determination result to that effect is given. In this manner, the notification setting shown in the display region 208b corresponds to the notification setting of the event added by being extracted by the server apparatus 30.

Further, the display region 208c indicates that, in a case where the protected person indicated by the icon 351 leaves school, notification of a determination result to that effect is given. Note that an icon 322 displayed in the display region 208c is an icon indicating school. Further, the display region 208d indicates that in a case where a family member represented by an icon 353 leaves the supermarket by bus, notification of a determination result to that effect is given. Note that icons 323 and 324 displayed in the display region 208d are icons indicating a supermarket and a bus as a means of movement, respectively.

In addition, in the vicinity of the display regions 208 in the display region 162 are displayed icons 510a, 510b, 510c, and 510d for switching on or off the notification settings indicated by the respective display regions 208. By selecting the icons 510a, 510b, 510c, and 510d by a tapping operation or the like, the notification settings corresponding to the display regions 208a, 208b, 208c, and 208d are switched on or off, respectively.

The list screen D61 also displays an estimate of battery consumption by notification settings that are currently on. For example, the example where four notification settings are on in FIG. 23 displays that the notification settings cause an increase of about 12% per day, and the example where three notification settings are on in FIG. 23 displays that the notification settings cause an increase of about 8% per day. For example, in a case where the content of each notification setting is changed, the estimate of the battery consumption displayed on the list screen D61 changes accordingly. In this manner, displaying the estimate of battery consumption on the list screen D61 makes it possible to determine which notification setting is to be turned on from the viewpoint of power saving. For example, as illustrated in FIG. 23, turning off the notification setting corresponding to the display region 208d makes it possible to reduce the battery consumption due to the notification settings by about 4% per day.

The estimate of the battery consumption by notification settings is specifically calculated by the server apparatus 30 or the terminals of the respective members. For example, an estimate of battery consumption may be calculated on the basis of the type of a sensor used to achieve the notification defined by each notification setting, the frequency of detections by the sensor, and the like.

Here, it is possible to reduce the battery consumption due to notification settings by devising, as appropriate, the type of the sensor used to achieve the notification defined by each notification setting and the frequency of detections by the sensor. For example, the frequency of detecting the position of a member relatively distant from him/herself may be reduced, because it is less necessary to detect the position in detail as compared with the position of a member located nearer than the member. Further, for example, Wi-Fi (registered trademark) may be preferentially used for the position detection in a situation where Wi-Fi (registered trademark) is available, because power consumption in position detection using Wi-Fi (registered trademark) is lower than (e.g., about a fraction of) that in position detection using a GNSS. Further, for example, in a case where a member whose position is to be detected is moving by train, the frequency of position detection may be lower than that in a case where the member is moving by car, for example, because a moving route is along the track, though the route may branch due to the transfer at stations, and a moving speed is able to be estimated.

Here, for example, in a case where the icon 320 in the display region 207 of the map screen D24 illustrated in FIG. 22 is selected by a tapping operation or the like, the screen displayed by the user terminal 20 or the like transitions to a setting screen for adjusting the event notification setting shown by the display region 207. A setting screen D71 illustrated in FIG. 24 is an example of a setting screen for an event notification setting in such a case.

Note that the setting screen D71 described below is a setting screen for adjusting a reference region in the event notification setting; however, an icon indicating a reference condition corresponding to the reference region is displayed in the display region 207, and in a case where such an icon is selected, a setting screen for adjusting a reference condition is displayed.

As illustrated in FIG. 24, the setting screen D71 shows a display region 172 in which a reference region candidate 707, which is a region corresponding to the park indicated by the icon 318 in FIG. 21, and an icon 607 indicating a position of a representative point of the reference region candidate 707 are displayed superimposed on a map. The extracted reference region candidate 707 corresponds to a region within a reference radius of 120 m from the representative point. Also shown below the display region 172 is a display region 173 for accepting an input operation. The display region 173 is provided with a setting tab 325 and a battery tab 326. In a case where the setting tab 325 is selected, a slider 511 for adjusting the reference radius of the reference region candidate 707 and a button 512 for completing the adjustment of the reference region candidate 707 are displayed in the display region 173.

A member who operates the terminal is able to adjust the reference radius of the reference region candidate 707 using the slider 511 displayed in the display region 173. It is also possible for the member to complete an operation of determining a reference region using the button 512 displayed in the display region 173. For example, the member may determine the extracted reference region candidate 707 itself as a reference region to be set in the notification setting. In addition, the member may determine a region obtained by adjusting the reference radius of the extracted reference region candidate 707 as a reference region to be set in the notification setting.

Here, in a case where the battery tab 326 of the display region 173 is selected, as illustrated in FIG. 24, the content displayed in the display region 173 is switched to information related to battery consumption by the notification setting corresponding to the setting screen D71. For example, in the display region 173 is displayed an estimate of the number of notifications (10 per week and 32 per month in the example of FIG. 24) caused by the notification setting corresponding to the setting screen D71 in a case where adjustment is completed in the current state. Note that the estimate of the number of notifications may be predicted on the basis of the history of the positions of the family members by using, for example, a technique such as machine learning. Also displayed in the display region 173 is an estimate of battery consumption (an increase of about 3% per day in the example of FIG. 24) by the notification setting corresponding to the setting screen D71 in a case where adjustment is completed in the current state.

In a case where the reference radius of the reference region candidate 707 is changed, for example, the information related to the battery consumption displayed in the display region 173 in a case where the battery tab 326 is selected changes accordingly. This makes it possible to appropriately adjust the notification setting corresponding to the setting screen D71 from the viewpoint of power saving.

Also shown above the display region 172 is a display region 171 in which various buttons and messages are displayed. For example, as illustrated in FIG. 24, in the display region 171 may be displayed a display region 209 indicating the same content as that in the display region 207 in FIG. 22.

3. Effects of Watch-Over System

Next, effects of the watch-over system 1 according to the present embodiment will be described.

In the watch-over system 1 according to the present embodiment, it is determined whether or not the position of a target is within a reference region, which is a geographic region. In addition, a reference region candidate as a candidate for the reference region is extracted. Further, information related to the extracted reference region candidate is outputted in association with a reference condition. This enables a user such as a protector to perform setting related to the reference region while referring to the reference region candidate and the reference condition corresponding to the reference region candidate. This makes it possible to reduce the human burdens in the setting work for the watch-over system 1.

Further, in the watch-over system 1 according to the present embodiment, in a case where it is determined that the position of the target is within the reference region, it may be determined whether or not the reference condition corresponding to the reference region is satisfied. This makes it possible to determine the state of the target more appropriately on the basis of, in addition to the determination result as to whether or not the position of the target is within the reference region, the determination result as to whether or not the reference condition corresponding to the reference region is satisfied.

Further, in the watch-over system 1 according to the present embodiment, the reference condition may include a time condition, which is a condition that defines time-related information. This makes it possible to determine the state of the target more appropriately in accordance with the time-related information. For example, it is possible to more appropriately determine whether or not the position of the target is in a normal state in accordance with the time-related information.

Further, in the watch-over system 1 according to the present embodiment, the reference condition may include an environment condition, which is a condition that defines environment-related information. This makes it possible to determine the state of the target more appropriately in accordance with the environment-related information. For example, it is possible to more appropriately determine whether or not the position of the target is in a normal state in accordance with the environment-related information.

Further, in the watch-over system 1 according to the present embodiment, the reference condition may include a behavior condition, which is a condition that defines information related to a behavior of the target. This makes it possible to determine the state of the target more appropriately in accordance with the information related to the behavior of the target. For example, it is possible to appropriately determine whether the behavior of the target is in a normal state.

Further, in the watch-over system 1 according to the present embodiment, a reference region and a reference condition may be set on the basis of a history of input information from the user with respect to outputted information related to determination results. This makes it possible to more appropriately adjust settings of the reference region and the reference condition on the basis of the user's preference with respect to the output of the information related to the determination results.

Further, in the watch-over system 1 according to the present embodiment, information related to determination results may be outputted on the basis of the history of the input information from the user with respect to the outputted information related to the determination results. This makes it possible to more appropriately adjust the output of the information related to the determination results on the basis of the user's preference with respect to the output of the information related to the determination results.

Further, in the watch-over system 1 according to the present embodiment, the reference region candidate may be extracted on the basis of a history of the position of the target. This makes it possible to appropriately extract a region in which the target is located relatively frequently as the reference region candidate.

Further, in the watch-over system 1 according to the present embodiment, the reference condition corresponding to the reference region candidate may be extracted on the basis of the history of the position of the target. This makes it possible to appropriately extract, as the reference condition, a condition defining an event that occurs relatively frequently in a case where the target is located in the reference region candidate.

4. Application Example

Next, referring to FIGS. 25 to 27, a watch-over system 2 according to an application example will be described.

FIG. 25 is a schematic diagram illustrating an example of a schematic configuration of the watch-over system 2 according to the application example. FIG. 26 is an explanatory diagram illustrating an example of a map screen D81 displayed by an agent apparatus 40 according to the application example at the time of determination result notification. FIG. 27 is an explanatory diagram illustrating an example of a map screen D23 displayed by the user terminal 20 at the time of determination result notification.

The watch-over system 2 differs from the watch-over system 1 described above in that, for example, it further includes the agent apparatus 40, as illustrated in FIG. 25. The agent apparatus 40 communicates with the target terminal 10, the user terminal 20, and the server apparatus 30 via the wired or wireless information network N10. Note that the number of the agent apparatuses 40 in the watch-over system 2 is not limited to the example illustrated in the drawing, and may be two or more, for example. In the following, to facilitate understanding, an example in which the watch-over system 2 includes one agent apparatus 40 will be mainly described.

The agent apparatus 40 is an apparatus that is able to be operated by sound. Specifically, when being spoken to by a user, it is possible for the agent apparatus 40 to recognize the spoken content, and output a sound or display a screen in accordance with the content. As described above, the agent apparatus 40 is an apparatus that is able to provide various kinds of information to the user in accordance with the content spoken by the user. Note that the agent apparatus 40 may provide various kinds of information to the user in response to a trigger other than being spoken to by the user, as will be described later.

The agent apparatus 40 includes, for example, a camera, a microphone, a projector, and a speaker. For example, the agent apparatus 40 is able to recognize the user by acquiring an image showing the user by the camera and performing image processing on the image. It is also possible for the agent apparatus 40 to acquire information indicating the user's voice by the microphone, and recognize a content of the user's voice using the information. In addition, the agent apparatus 40 is able to perform display by projecting a screen onto a wall 5 or the like by the projector. FIG. 25 illustrates how the agent apparatus 40 projects and displays a screen D80 on the wall 5. It is also possible for the agent apparatus 40 to output a sound through the speaker.

In the application example, since the agent apparatus 40 is able to communicate with the server apparatus 30, using the agent apparatus 40 makes it possible to provide the user with various kinds of information obtained by the above-described processes performed by the server apparatus 30. For example, it is possible to provide the user with various kinds of information of which notification is given by the above-described user terminal 20 also by the agent apparatus 40 outputting a sound or displaying a screen. Hereinafter, more specific description will be given on examples of processes that are related to such provision of information to the user using the agent apparatus 40.

As described above, for example, in a case where the position of the protected person moves out of (leaves) the reference region from within any reference region, the determination unit 32 of the server apparatus 30 determines that the protected person has so moved. In the application example, it is possible to cause the server apparatus 30 to transmit information related to a determination result by the determination unit 32 to the agent apparatus 40.

It is possible to set a transmission destination of the information related to the determination result by, for example, operating the user terminal 20. For example, the user terminal 20 displays a screen for setting such a transmission destination, and the agent apparatus 40 is set as a transmission destination of the information related to the determination result by an operation on the screen. Then, in a case where the agent apparatus 40 is set as the transmission destination of the information related to the determination result, the server apparatus 30 transmits the information related to the determination result to the agent apparatus 40.

Note that in a case where the user terminal 20 is set, in addition to the agent apparatus 40, as the transmission destination of the information related to the determination result, the server apparatus 30 transmits the information related to the determination result also to the user terminal 20.

The agent apparatus 40 is able to provide the user with the acquired information related to the determination result by, for example, outputting a sound and displaying a screen. For example, when a user registered in the agent apparatus 40 in advance approaches the vicinity of the agent apparatus 40, the agent apparatus 40 outputs, by sound, and displays the acquired information related to the determination result. The map screen D81 illustrated in FIG. 26 is an example of a map screen showing the determination result displayed together with sound output by the agent apparatus 40 in such a case.

Note that, specifically, the agent apparatus 40 may determine that the user has approached the vicinity of the agent apparatus 40 in a case where the camera recognizes that the user is located within a set distance from the agent apparatus 40. Further, in a case where a plurality of users is registered in the agent apparatus 40, the agent apparatus 40 may display different screens depending on the user who has approached the vicinity of the agent apparatus 40. In addition, the agent apparatus 40 may determine whether or not to display a screen depending on the user who has approached the vicinity of the agent apparatus 40.

As illustrated in FIG. 26, in a display region 181 located on the middle side of the map screen D81, the set reference regions 901, 902, and 903, the icons 605 and 606 indicating the positions of the representative points of the reference regions 901 and 902, and the moving route 802 of the protected person are displayed superimposed on a map, as in the display region 122 of the map screen D22 illustrated in FIG. 17. For example, the icons 605 and 606 indicate the positions of the representative points of the protected person's home and school, respectively. The reference regions 901 and 902 each correspond to a region within a reference radius from the representative point. The reference region 903 corresponds to a region within a route having a reference width from the representative point of the reference region 901 to the representative point of the reference region 902.

Above the display region 181 in the map screen D81 is further shown a display region 210 in which a content of a determination result is displayed by text or the like. For example, in a case where the protected person leaves the reference region 903 corresponding to the region within the route from home to school, the display region 210 indicating that the protected person has left the reference region 903 is displayed above the display region 181, as illustrated in FIG. 26. Note that, as illustrated in FIG. 26, the time at which the protected person left the reference region 903 may be displayed in the display region 210. In addition, below the display region 181 in the map screen D81 is further shown a display region 211 in which the current location of the protected person that has left the reference region 903 is displayed by text or the like.

When the user approaches the vicinity of the agent apparatus 40, the agent apparatus 40, for example, outputs a sound indicating that the protected person has left the reference region 903, and projects and displays the map screen D81 illustrated in FIG. 26 on the wall 5. Note that, in a case where there is a plurality of pieces of information related to determination results acquired from the server apparatus 30, the agent apparatus 40 may preferentially provide the user with, for example, information acquired at the most recent time.

In addition, the agent apparatus 40 may output a sound indicating that it is possible to transmit a message to the target terminal 10 carried by the protected person. Thereafter, for example, in a case of being spoken to by the user to transmit a message, the agent apparatus 40 switches the displayed map screen D81 to a screen for transmitting a message. Then, the user is able to transmit a desired message to the target terminal 10 by speaking the message to be transmitted to the agent apparatus 40. Note that it is also possible for the target terminal 10 to transmit a message to the agent apparatus 40, and the agent apparatus 40 may display, on the screen, messages transmitted and received between the target terminal 10 and the agent apparatus 40. In addition, in each message transmitted and received between the target terminal 10 and the agent apparatus 40 may be displayed the name of the user corresponding to the transmission destination terminal. In addition, on transmitting or receiving a message, the agent apparatus 40 may output a sound to that effect.

As described above, the server apparatus 30 may transmit information related to determination results to the user terminal 20 in addition to the agent apparatus 40. In that case, for example, the user terminal 20 displays the home screen D41 described with reference to FIG. 16, and then displays the map screen D22 described with reference to FIG. 17. Here, the screen displayed by the user terminal 20 as the screen related to the determination result notification is not limited to the above examples, and various screens may be applied as such a screen. For example, the user terminal 20 may display a screen that includes an object for transmitting a message to the target terminal 10 carried by the protected person. The map screen D23 illustrated in FIG. 27 is an example of a map screen in such a case.

The map screen D23 illustrated in FIG. 27 differs from the map screen D22 illustrated in FIG. 17 mainly in the content displayed at the bottom of the screen. As illustrated in FIG. 27, at the bottom of the map screen D23, for example, a display region 212 in which a content of a determination result (specifically, the fact that the protected person has left the reference region 903) is displayed by text or the like, a button 513 for transmitting a message, a button 514 for checking the current position of the protected person, and a button 515 for inputting information indicating not wishing to be notified from now on of the information related to the determination result shown by the display region 212 are displayed in this order from the top.

The protector is able to switch the displayed map screen D23 to a screen for transmitting a message by selecting the button 513 by a tapping operation or the like. Then, the protector is able to transmit the desired message to the target terminal 10 by inputting the message to be transmitted. Note that it is also possible for the target terminal 10 to transmit a message to the user terminal 20, and the user terminal 20 may display, on the screen, messages transmitted and received between the target terminal 10 and the user terminal 20. In addition, messages transmitted and received between the target terminal 10 and the user terminal 20 may also be transmitted to the agent apparatus 40 from the terminals, and the agent apparatus 40 may display the messages.

In addition, the protector is able to switch the displayed map screen D23 to a screen showing the current position of the protected person by selecting the button 514 by a tapping operation or the like. It is also possible for the protector to input negative information indicating that the protector does not wish to be notified from now on of information related to the determination result shown by the display region 212, by selecting the buttons 515 by a tapping operation or the like.

As described above, the server apparatus 30 may acquire a variety of information including information detected by the target terminal 10 and the user terminal 20, and the like. The server apparatus 30 may perform various processes other than the above-described processes using the variety of information obtained in this manner. For example, the server apparatus 30 may determine whether or not members of a group such as a family have encountered each other, and may transmit information related to the determination result to the agent apparatus 40 or the user terminal 20. Note that, specifically, such a process is able to be achieved by using position information of the members that is detected by the terminals carried by the respective members.

In a case where the information related to the determination result as to the encounter between members is transmitted to the agent apparatus 40, the agent apparatus 40 is able to provide the user with the acquired information related to the determination result by outputting a sound and displaying a screen, as described above. Further, the agent apparatus 40 may execute a process for transmitting a message to the terminals carried by the members who have encountered, as with the above-described process for transmitting a message to the target terminal 10.

Further, in a case where the information related to the determination result as to the encounter between members is transmitted to the user terminal 20, the user terminal 20 may display various screens related to notification of the acquired determination result, as described above. Further, the user terminal 20 may execute a process for transmitting a message to the terminals carried by the members who have encountered, as with the above-described process for transmitting a message to the target terminal 10.

In addition, in a case where members of the group encounter in a region passed through by the members relatively infrequently (i.e., usually not visited so often by the members), the server apparatus 30 may extract the encounter between members in such a region as the event described above. In that case, the server apparatus 30 extracts the region where the members have encountered each other, for example, as a reference region candidate in determining whether or not an event has occurred. Thereafter, by applying the extracted reference region candidate as a reference region, the server apparatus 30 is able to determine whether or not the event corresponding to the members encountering in the region has occurred.

In addition, the server apparatus 30 may transmit, to the agent apparatus 40 or the user terminal 20, information related to a determination result in such determination as to whether an event has occurred. For example, in a case where the members encounter again in the region, the server apparatus 30 may transmit a determination result to that effect to the agent apparatus 40 or the user terminal 20. Also in this case, the agent apparatus 40 is able to provide the user with information related to the determination result by outputting a sound and displaying a screen, as described above. In addition, the user terminal 20 may display various screens related to notification of the acquired determination result, as described above.

5. Conclusion

As described above, the server apparatus 30 according to the present embodiment includes the determination unit 32 that determines whether or not the position of a target is within a reference region, which is a geographic region, the extraction unit 33 that extracts a reference region candidate, which is a candidate for the reference region, and the communication unit 31 that outputs information related to the extracted reference region candidate in association with a reference condition. This enables a user such as a protector to perform setting related to the reference region while referring to the reference region candidate and the reference condition corresponding to the reference region candidate. This makes it possible to reduce the human burdens in the setting work for the watch-over system 1.

Note that, although described above is an example in which the server apparatus 30 corresponds to an example of the information processing apparatus according to the present disclosure in the watch-over system 1, another apparatus in the watch-over system 1 may have some or all of the functions of the information processing apparatus according to the present disclosure. For example, the user terminal 20 may have all of the functions described above as the functions of the server apparatus 30. Further, the user terminal 20 and the server apparatus 30 may share some of the functions described above as the functions of the server apparatus 30.

Note that the series of control processes by each apparatus described in this specification may be achieved using any of software, hardware, and a combination of software and hardware. Programs constituting the software are stored in advance in, for example, a storage medium (non-transitory medium) provided inside or outside each apparatus. Each program is, for example, read into a RAM at the time of execution and is executed by a processor such as a CPU. Each program may be executed by a single processor or a plurality of processors.

Specifically, it is possible to create computer programs for achieving the functions of the server apparatus 30 according to the present embodiment as described above, and mount the computer programs on PCs or the like. The server apparatus 30 according to the present embodiment may correspond to a computer. It is also possible to provide a computer-readable recording medium in which such a computer program is stored. The recording medium is, for example, a magnetic disk, an optical disk, a magneto-optical disk, a flash memory, or the like. Further, the computer program may be distributed via a network, for example, without using a recording medium. In addition, a plurality of computers may share the functions of the server apparatus 30 according to the present embodiment; in that case, functions of the plurality of computers may be achieved by the computer programs described above.

In addition, the processes described with reference to the flowcharts in this specification do not necessarily have to be executed in the order shown in the flowcharts. Some processing steps may be executed in parallel. Further, additional processing steps may be adopted, and some processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Note that the technical scope of the present disclosure also includes the following configurations.

(1)

An information processing apparatus including:

a determination unit that determines whether or not a position of a target is within a reference region, the reference region being a geographic region;

an extraction unit that extracts a reference region candidate as a candidate for the reference region; and an output unit that outputs information related to the extracted reference region candidate in association with a reference condition.

(2)

The information processing apparatus according to (1), in which the determination unit determines whether or not the reference condition corresponding to the reference region is satisfied in a case where the position of the target is determined to be within the reference region.

(3)

The information processing apparatus according to (1) or (2), in which the reference condition includes a time condition as a condition that defines time-related information, an environment condition as a condition that defines environment-related information, or a behavior condition as a condition that defines information related to a behavior of the target.

(4)

The information processing apparatus according to (3), in which the information related to the behavior of the target includes information indicating a means of movement, an accompanying person, or a behavior content of the target.

(5)

The information processing apparatus according to any one of (1) to (4), including a setting unit that sets the reference region and the reference condition on a basis of the extracted reference region candidate.

(6)

The information processing apparatus according to (5), in which the output unit outputs information related to a determination result by the determination unit.

(7)

The information processing apparatus according to (6), in which the setting unit sets the reference region and the reference condition on a basis of a history of input information from a user with respect to the outputted information related to the determination result by the determination unit.

(8)

The information processing apparatus according to (6) or (7), in which, on a basis of a history of input information from a user with respect to the outputted information related to the determination result by the determination unit, the output unit outputs the information related to the determination result by the determination unit.

(9)

The information processing apparatus according to any one of (1) to (8), in which the extraction unit extracts the reference region candidate or the reference condition corresponding to the reference region candidate on a basis of a history of the position of the target.

(10)

An information processing method including:

determining whether or not a position of a target is within a reference region, the reference region being a geographic region;

extracting a reference region candidate as a candidate for the reference region; and outputting, by an information processing apparatus, information related to the extracted reference region candidate in association with a reference condition.

(11)

A program causing a computer to function as:

a determination unit that determines whether or not a position of a target is within a reference region, the reference region being a geographic region:

an extraction unit that extracts a reference region candidate as a candidate for the reference region; and an output unit that outputs information related to the extracted reference region candidate in association with a reference condition.

(12)

The program according to (11), in which the determination unit determines whether or not the reference condition corresponding to the reference region is satisfied in a case where the position of the target is determined to be within the reference region.

(13)

The program according to (11) or (12), in which the reference condition includes a time condition as a condition that defines time-related information, an environment condition as a condition that defines environment-related information, or a behavior condition as a condition that defines information related to a behavior of the target.

(14)

The program according to (13), in which the information related to the behavior of the target includes information indicating a means of movement, an accompanying person, or a behavior content of the target.

(15)

The program according to any one of (11) to (14), causing the computer to further function as a setting unit that sets the reference region and the reference condition on a basis of the extracted reference region candidate.

(16)

The program according to (15), in which the output unit outputs information related to a determination result by the determination unit.

(17)

The program according to (16), in which the setting unit sets the reference region and the reference condition on a basis of a history of input information from a user with respect to the outputted information related to the determination result by the determination unit.

(18)

The program according to (16) or (17), in which, on a basis of a history of input information from a user with respect to the outputted information related to the determination result by the determination unit, the output unit outputs the information related to the determination result by the determination unit.

(19)

The program according to any one of (11) to (18), in which the extraction unit extracts the reference region candidate or the reference condition corresponding to the reference region candidate on a basis of a history of the position of the target.

REFERENCE NUMERALS LIST 1 watch-over system
10 target terminal
20 user terminal
30 server apparatus
31 communication unit
32 determination unit
33 extraction unit
34 setting unit
35 storage unit
N10 information network

The invention claimed is:

1. An information processing apparatus comprising:
circuitry configured to
determine a position of a target in relation to a reference region, the reference region being a geographic region, and the reference region corresponding to one of a plurality of reference region candidates,
extract a reference region candidate among the plurality of reference region candidates as a candidate for the reference region, the reference region candidate being extracted based on a history of the position of the target with respect to the extracted reference region candidate during a predetermined time period, and
output information related to the extracted reference region candidate in association with a reference condition corresponding to the extracted reference region candidate, the reference condition including a time condition based on time-related information indicating when the position of the target is within the extracted reference region candidate during the predetermined time period,
wherein the extracted reference region candidate is initially determined within a reference radius from a representative point of the reference region based on the history of the position of the target and the reference radius is configured to be subsequently set by a user, and
wherein the circuitry outputs the information related to the extracted reference region when the circuitry determines that the position of the target is outside the extracted reference region candidate during a time period corresponding to the time-related information.

2. The information processing apparatus according to claim 1, wherein the reference condition further includes at least one of an environment condition that defines environment-related information or a behavior condition that defines information related to a behavior of the target.

3. The information processing apparatus according to claim 2, wherein the information related to the behavior of the target includes information indicating a means of movement, an accompanying person, or a behavior content of the target.

4. The information processing apparatus according to claim 1, wherein the circuitry is further configured to set the representative point of the reference region on a basis of plot points of the position of the target during the predetermined time period.

5. The information processing apparatus according to claim 4, wherein the circuitry outputs the information related to the extracted reference region candidate based on a determination result of the position of the target.

6. The information processing apparatus according to claim 5, wherein the circuitry sets the reference region and the reference condition on a basis of a history of input information from the user with respect to the outputted information related to the determination result.

7. The information processing apparatus according to claim 5, wherein, on a basis of a history of input information from the user with respect to the outputted information related to the determination result, the circuitry outputs the information related to the determination result.

8. The information processing apparatus according to claim 1, wherein the reference radius of the extracted reference region candidate is initially determined according to a density of plot points of the position of the target during the predetermined time period.

9. The information processing apparatus according to claim 1, wherein the circuitry outputs the information related to the extracted reference region candidate in relation to a map screen.

10. An information processing method comprising:
  determining a position of a target in relation to a reference region, the reference region being a geographic region, and the reference region corresponding to one of a plurality of reference region candidates;
  extracting a reference region candidate among the plurality of reference region candidates as a candidate for the reference region, the reference region candidate being extracted based on a history of the position of the target with respect to the extracted reference region candidate during a predetermined time period; and
  outputting, by an information processing apparatus, information related to the extracted reference region candidate in association with a reference condition corresponding to the extracted reference region candidate, the reference condition including a time condition based on time-related information indicating when the position of the target is within the extracted reference region candidate during the predetermined time period,
  wherein the extracted reference region candidate is initially determined within a reference radius from a representative point of the reference region based on the history of the position of the target and the reference radius is configured to be subsequently set by a user, and
  wherein the information related to the extracted reference region is output when it is determined that the position of the target is outside the extracted reference region candidate during a time period corresponding to the time-related information.

11. A non-transitory computer-readable medium having embodied thereon a program, which when executed by a computer causes the computer to execute a method, the method comprising:
  determining a position of a target in relation to a reference region, the reference region being a geographic region, and the reference region corresponding to one of a plurality of reference region candidates;
  extracting a reference region candidate among the plurality of reference region candidates as a candidate for the reference region, the reference region candidate being extracted based on a history of the position of the target with respect to the extracted reference region candidate during a predetermined time period; and
  outputting information related to the extracted reference region candidate in association with a reference condition corresponding to the extracted reference region candidate, the reference condition including a time condition based on time-related information indicating when the position of the target is within the extracted reference region candidate during the predetermined time period,
  wherein the extracted reference region candidate is initially determined within a reference radius from a representative point of the reference region based on the history of the position of the target and the reference radius is configured to be subsequently set by a user, and
  wherein the information related to the extracted reference region is output when it is determined that the position of the target is outside the extracted reference region candidate during a time period corresponding to the time-related information.

12. The non-transitory computer-readable medium according to claim 11, wherein the reference condition further includes at least one of an environment condition that defines environment-related information or a behavior condition that defines information related to a behavior of the target.

13. The non-transitory computer-readable medium according to claim 12, wherein the information related to the behavior of the target includes information indicating a means of movement, an accompanying person, or a behavior content of the target.

14. The non-transitory computer-readable medium according to claim 11, wherein the method further comprises setting the representative point of the reference region on a basis of plot points of the position of the target during the predetermined time period.

15. The non-transitory computer-readable medium according to claim 14, wherein the outputting of the information related to the extracted reference region candidate includes information related to a determination result of the position of the target.

16. The non-transitory computer-readable medium according to claim 15, wherein representative point of the reference region is set on a basis of a history of input information from a user with respect to the outputted information related to the determination result.

17. The non-transitory computer-readable medium according to claim 15, wherein, on a basis of a history of input information from a user with respect to the outputted information related to the determination result, the method further comprises outputting the information related to the determination result.

* * * * *